(12) United States Patent
Turkevich et al.

(10) Patent No.: US 6,858,551 B1
(45) Date of Patent: Feb. 22, 2005

(54) FERROELECTRIC FIBERS AND APPLICATIONS THEREFOR

(75) Inventors: Leonid Anthony Turkevich, Alpharetta, GA (US); David Lewis Myers, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/267,973

(22) Filed: Mar. 12, 1999

Related U.S. Application Data

(60) Division of application No. 08/762,213, filed on Dec. 6, 1996, now Pat. No. 6,162,535, which is a continuation-in-part of application No. 08/653,562, filed on May 24, 1996, now abandoned.

(51) Int. Cl.$^7$ .......................... B32B 27/18; A62B 18/02

(52) U.S. Cl. ....................... 442/414; 428/372; 428/373; 128/205.27; 264/210.8

(58) Field of Search .................... 442/414; 128/205.27; 264/210.8; 428/372, 375

(56) References Cited

U.S. PATENT DOCUMENTS

| | | | |
|---|---|---|---|
| 3,016,599 A | 1/1962 | Perry, Jr. ........................ | 28/78 |
| 3,341,394 A | 9/1967 | Kinney ......................... | 161/72 |
| 3,655,862 A | 4/1972 | Dorschner et al. ........... | 264/290 |
| 3,692,618 A | 9/1972 | Dorschner et al. ............ | 161/72 |
| 3,704,198 A | 11/1972 | Prentice ....................... | 161/148 |
| 3,705,068 A | 12/1972 | Dobo et al. ................... | 156/441 |
| 3,745,142 A | 7/1973 | Mahlman ....................... | 260/41 |
| 3,746,142 A | 7/1973 | Hepp et al. .................. | 197/133 |
| 3,755,527 A | 8/1973 | Keller et al. ................. | 264/210 |

(List continued on next page.)

FOREIGN PATENT DOCUMENTS

| | | | |
|---|---|---|---|
| EP | 0 594 123 | 4/1994 | .................. 55/524 |
| EP | 0 615 007 | 9/1994 | |
| EP | 0 623 941 | 11/1994 | ................. 204/168 |

(List continued on next page.)

OTHER PUBLICATIONS

Japanese Abstract for 63211366; Sep. 2, 1988 (SciFinder Abstract).

(List continued on next page.)

*Primary Examiner*—Rena Dye
*Assistant Examiner*—J. M. Gray
(74) *Attorney, Agent, or Firm*—Christos S. Kyriakou

(57) ABSTRACT

A fiber which includes a thermoplastic polymer and particles of a ferroelectric material dispersed therein. The thermoplastic polymer may be, for example, a polyolefin, such as polypropylene or polyethylene, and the ferroelectric material may be barium titanate. The ferroelectric material may be present at a level of from about 0.01 to about 50 percent by weight (from about 0.001 to about 13 percent by volume), and will have a longest dimension in a range of from about 10 nanometers to about 10 micrometers. The fiber may be exposed to an electric field. A plurality of the fibers may be employed to form a knitted or woven fabric or a nonwoven web. Also provided is a method of preparing fibers containing particles of a ferroelectric material. The method includes destructuring the ferroelectric material in the presence of a liquid and a surfactant to give destructured particles; the liquid is a solvent for the surfactant and the surfactant is adapted to stabilize the destructured particles against agglomeration. A blend of the stabilized, destructured ferroelectric material particles and a thermoplastic polymer then is formed and extruded to form fibers. The extruded fibers may be collected on a moving foraminous support to form a nonwoven web and, if desired, may be exposed to an electric field. The fiber of the present invention, especially when in the form of a nonwoven web, is especially suited as a filtration medium. For example, the nonwoven web may be adapted to remove particulate matter from a gaseous stream.

24 Claims, 6 Drawing Sheets

U.S. PATENT DOCUMENTS

| | | | |
|---|---|---|---|
| 3,767,444 A | 10/1973 | Zeisberger | 106/308 R |
| 3,802,817 A | 4/1974 | Matsuki et al. | 425/66 |
| 3,849,241 A | 11/1974 | Butin et al. | 161/169 |
| 3,853,651 A | 12/1974 | Porte | 156/73.6 |
| 3,959,421 A | 5/1976 | Weber et al. | |
| 3,978,185 A | 8/1976 | Buntin et al. | 264/93 |
| 4,002,779 A | 1/1977 | Nischwitz | 427/124 |
| 4,041,203 A | 8/1977 | Brock et al. | |
| 4,064,605 A | 12/1977 | Akiyama et al. | 28/103 |
| 4,091,140 A | 5/1978 | Harmon | 428/288 |
| 4,100,319 A | 7/1978 | Schwartz | 428/171 |
| 4,100,324 A | 7/1978 | Anderson et al. | 428/288 |
| 4,118,531 A | 10/1978 | Hauser | 428/224 |
| 4,215,682 A | 8/1980 | Kubik et al. | |
| 4,229,187 A | 10/1980 | Stockford et al. | |
| 4,308,223 A | 12/1981 | Stern | 264/22 |
| 4,315,881 A | 2/1982 | Nakajima et al. | |
| 4,340,563 A | 7/1982 | Appel et al. | 264/518 |
| 4,342,849 A | 8/1982 | Kennedy | |
| 4,375,718 A | 3/1983 | Wadsworth et al. | |
| 4,405,297 A | 9/1983 | Appel et al. | 425/72 |
| 4,434,204 A | 2/1984 | Hartman et al. | 428/198 |
| 4,468,432 A | 8/1984 | Matsukura et al. | 428/328 |
| 4,513,049 A | 4/1985 | Yamasaki et al. | |
| 4,564,721 A * | 1/1986 | Ishikawa et al. | 174/10 |
| 4,588,537 A | 5/1986 | Klaase et al. | 264/22 |
| RE32,171 E | 6/1986 | Van Turnout | |
| 4,592,815 A | 6/1986 | Nakao | 204/165 |
| 4,622,259 A | 11/1986 | McAmish et al. | |
| 4,626,263 A | 12/1986 | Inoue et al. | 55/155 |
| 4,627,811 A | 12/1986 | Greiser et al. | 425/72 S |
| 4,644,045 A | 2/1987 | Fowells | 526/348 |
| 4,652,282 A | 3/1987 | Ohmori et al. | 55/155 |
| 4,663,220 A | 5/1987 | Wisneski et al. | 428/22 |
| 4,789,504 A | 12/1988 | Ohmori et al. | 264/22 |
| 4,874,399 A | 10/1989 | Reed et al. | |
| 4,874,659 A | 10/1989 | Ando et al. | |
| 4,917,942 A | 4/1990 | Winters | |
| 4,963,390 A | 10/1990 | Lipeles et al. | |
| 4,969,457 A | 11/1990 | Hubbard et al. | |
| 5,057,710 A | 10/1991 | Nishiura et al. | 307/400 |
| 5,070,223 A * | 12/1991 | Colasante | 219/10.55 |
| 5,110,620 A | 5/1992 | Tani et al. | 427/40 |
| 5,112,677 A | 5/1992 | Tani et al. | 428/240 |
| 5,143,767 A | 9/1992 | Matsuura et al. | |
| 5,165,979 A | 11/1992 | Watkins et al. | |
| 5,188,885 A | 2/1993 | Timmons et al. | |
| 5,204,174 A | 4/1993 | Daponte et al. | |
| 5,238,634 A | 8/1993 | Fetters et al. | |
| 5,246,637 A | 9/1993 | Matsuura et al. | |
| 5,256,176 A | 10/1993 | Matsuura et al. | |
| 5,270,121 A | 12/1993 | Kissel | 428/522 |
| 5,271,883 A | 12/1993 | Timmons et al. | |
| 5,288,402 A | 2/1994 | Yoshida | |
| 5,304,227 A | 4/1994 | Matsuura et al. | |
| 5,350,620 A | 9/1994 | Sundet et al. | |
| 5,350,624 A | 9/1994 | Georger et al. | |
| 5,382,400 A | 1/1995 | Pike et al. | |
| 5,401,446 A | 3/1995 | Tsai et al. | 264/22 |
| 5,405,913 A | 4/1995 | Harwood et al. | |
| 5,407,581 A | 4/1995 | Onodera et al. | |
| 5,409,765 A | 4/1995 | Boettcher et al. | |
| 5,409,766 A | 4/1995 | Yuasa et al. | 428/224 |
| 5,429,848 A | 7/1995 | Ando et al. | |
| 5,472,481 A | 12/1995 | Jones et al. | |
| 5,482,765 A | 1/1996 | Bradley et al. | |
| 5,482,772 A | 1/1996 | Strack et al. | |
| 5,534,335 A | 7/1996 | Everhart et al. | |
| 5,540,756 A | 7/1996 | Hoppitt et al. | |
| 5,554,722 A * | 9/1996 | Eichenauer et al. | 528/340 |
| 5,558,809 A | 9/1996 | Groh et al. | |
| 5,560,992 A | 10/1996 | Sargent et al. | |
| 5,597,645 A | 1/1997 | Pike et al. | |
| 5,607,766 A | 3/1997 | Berger | |
| 5,609,947 A | 3/1997 | Kamei et al. | |
| 5,610,455 A | 3/1997 | Allen et al. | |
| 5,620,785 A | 4/1997 | Watt et al. | |
| 5,635,134 A | 6/1997 | Bourne et al. | |
| 5,645,057 A | 7/1997 | Watt et al. | |
| 5,645,627 A | 7/1997 | Lifshutz et al. | |
| 5,652,048 A | 7/1997 | Haynes et al. | |
| 5,658,640 A | 8/1997 | Berrigan et al. | |
| 5,658,641 A | 8/1997 | Berrigan et al. | |
| 5,688,157 A | 11/1997 | Bradley et al. | |
| 5,694,925 A | 12/1997 | Reese et al. | |
| 5,707,735 A | 1/1998 | Midkiff et al. | |
| 5,709,735 A | 1/1998 | Midkiff et al. | |
| 5,721,180 A | 2/1998 | Pike et al. | |
| 5,726,107 A * | 3/1998 | Dahringer et al. | 428/288 |
| 5,765,556 A | 6/1998 | Brunson | |
| 5,800,866 A * | 9/1998 | Myers et al. | 427/220 |
| 5,855,784 A | 1/1999 | Pike et al. | |
| 5,871,845 A * | 2/1999 | Dahringer et al. | 428/378 |
| 5,955,546 A | 9/1999 | Bates et al. | |
| 6,001,299 A * | 12/1999 | Kawabe et al. | 264/436 |
| 2004/0000313 A1 * | 1/2004 | Gaynor et al. | 128/205.27 |

FOREIGN PATENT DOCUMENTS

| | | |
|---|---|---|
| EP | 0 639 611 | 2/1995 |
| GB | 1042906 | 10/1964 |
| JP | 60-126310 | 7/1985 |
| JP | 63-202663 | 8/1988 |
| JP | 63-288216 | 11/1988 |
| WO | 95/13856 | 5/1995 |
| WO | 96/13319 | 5/1996 |
| WO | 97/07272 | 2/1997 |
| WO | WO9711991 | 4/1997 |
| WO | 97/23246 | 7/1997 |
| WO | WO 97/44509 | * 11/1997 |
| WO | 97/44509 | 11/1997 |
| WO | WO 00/00267 | * 1/2000 |

OTHER PUBLICATIONS

Japanese Abstract for 63189461; Aug, 5, 1988 (SciFinder Abstract).

Japanese Abstract 08–067704.

Japanese Abstract 06–313058.

"Melt Blowing—A One–Step Web Process for New Nonwoven Products" by R. R. Butin et al., Journal of the Technical Association of the Pulp and Paper Industry, vol. 56, No. 4, pp. 74–77 (1973).

John Wiley & Sons, Encyclopedia of Polymer Science and Engineering, vol. 16, pp. 494–554 (1989), Journal of Applied Polymer Science, Studies of Polymer Electrets, vol. 27, pp. 381–395 (1982).

* cited by examiner

FERROELECTRIC FIBERS AND APPLICATIONS THEREFOR

This application is a division of application Ser. No. 08/762,213 entitled "FERROELECTRIC FIBERS AND APPLICATIONS THEREFOR" and filed in the U.S. Patent and Trademark Office on Dec. 6, 1996, now U.S. Pat. No. 6,162,535, which is a continuation-in-part of application Ser. No. 08/653,562, filed on May 24, 1996, now abandoned. The entireties of these applications are hereby incorporated herein by reference.

BACKGROUND OF THE INVENTION

The present invention relates to fibers, such as melt-extruded fibers, and to nonwoven webs prepared therefrom.

Air filter materials may be improved by treating the nonwovens in the presence of a high-intensity external electric field, thereby endowing the web with local electric fields which persist even after the high intensity electric field is removed (electret treatment). The electric fields associated with the fibers of the web can be used to attract foreign particles from a fluid stream which typically is air; i.e., the treatment imparts to the web an additional mechanism—attraction via electric field—beyond physical entrapment, to filter out foreign particles.

The use of electrically charged fibrous materials as filtration media has been known for some time. The advantage of materials of this type is that the charge on the fibers considerably augments the filtration efficiency without making any contribution to the airflow resistance. Among various dust filters, those made of electret fibers have high dust removing performances and are therefore suitable for attaining a high degree of cleanliness.

It is known that certain dielectric materials can be permanently electrostatically polarized, such as by heating the material, applying a high-voltage electric field, and cooling the material while under the influence of the electric field. Upon the removal of the electric field, an appropriate dielectric material becomes the electrical equivalent of a permanent magnet. A dielectric becomes an electret when the rate of decay of the field-induced polarization can be slowed down so much that a significant fraction of the polarization is preserved long after the polarizing field has been removed. Such electrets can be created by various methods, e.g. corona charging, triboelectric charging (friction), or any other charging technique (e.g. by liquid contact).

It has been established that air filters made of electret fibers are very effective in removing submicron aerosols. The electrostatic collection mechanism increases the efficiency of these electrostatically charged fibrous nonwoven materials relative to conventional, uncharged fibers. The filters have an increased ability for the capture of particles with no corresponding increase in pressure drop. Dust filters have been made from films prepared from nonpolar polymeric materials in which the films ar drawn, corona-charged, and treated with needle rolls to make fibrous materials which are then formed into the filters. Alternatively, a nonwoven fabric made of polypropylene fib rs and rayon fibers may be subjected to resin processing, followed by bending or shearing, whereby the surface layer of the fabric is charged with static electricity.

Electret formation may involve disposing a thread or filaments in an electrostatic field established between parallel closely spaced electrodes. Alternatively, a monofilament fiber, such as a polypropylene fiber, is closely wound on a hollow winding roller which has been previously surfaced with a polyamide-faced aluminum foil. This process, however, is discontinuous and requires charging times in excess of three hours for the wrapped roll.

Other processes for forming electrets involve softening the fibers in thermoplastic polymer webs with heat and, while the fibers are soft, subjecting them to a suitable electrostatic field to produce a charged fibrous web. This technique may be carried out with a film which then is fibrillated to form fibers which are collected and formed into a filter. An electrostatic spinning process is known in which a fibrous material is sprayed electrostatically from a liquid state and deposited on a conductive support. Meltblown fibers may be charged after being formed and before being deposited to form a web.

Several cold charging processes for the preparation of charged webs are known. Examples include the corona charging of combined webs made from layers of materials with differing conductivities. Charging is accompanied by utilizing a contact web, which is more conductive than the dielectric fibers of the filtration medium, and applying the charge through the more conductive medium. Another process involves placing a nonconductive web between the surface of a grounded metal electrode and a series of discharge electrodes. A suitable web (or film) may be conveniently cold charged by sequentially subjecting the web (or film) to a series of electric fields such that adjacent electric fields have substantially opposite polarities with respect to each other. In another method, a polymer film initially is passed across a corona discharge which imparts positive and negative charges on opposite sides of the film. The film then is mechanically split into small filaments, which are subsequently formed into a filter mat. In yet another process, a charge is released between fine wires and a surface electrode. The wires are biased with an electrostatic potential of several kilovolts. The structure to be charged, be it fiber or fabric, is positioned between the electrodes. Stable ions have been implanted, in the presence of a strong electric field, into the fibers of a polymeric filter structure which is at a temperature above the glass transition temperature but below the melt temperature of the polymer.

Triboelectric charging involves bringing two or more polymers into close contact and, due to their different dielectric properties, charge is transferred from one to the other. After taking both polymers apart, they are left in a charged state. In a variation, the fibers of a filter mat are coated with particles of zinc colophony resin. The fibrous structure is mechanically needled to fracture the zinc resin crystals. The frictional effect of particle-to-particle attrition and/or crystal fracture along internal planes is sufficient to cause the particles to acquire a positive or negative charge.

Many types of polymers have been investigated for use as air filters made of electret fibers. Suitable polymers for electrets are polyolefins (e.g., polypropylene and polyethylene), polycondensates (e.g., polyamides, polyesters, polycarbonates, and polyarylates), polyacrylates, polyacetals, polyimides, cellulose esters, polystyrenes, fluoropolymers, and polyphenylenesulfide. Also suitable are combinations of polymers (e.g., copolymers and polymer blends).

It is known that certain additives improve the efficiency of electret performance, but with sometimes variable results. Examples of additives or additive/polymer combinations include titanium dioxide in polyacrylate, a fatty acid metal salt (such as magnesium stearate and aluminum palmitate) in an insulating polymer material (e.g., polypropylene, polyethylene, polyesters, and polyamides). Other additives include charge control agents, such as those employed in toners for electrophotographic processes. These agents have been blended with polyolefins and other polymers. Organic or organometallic charge control agents have been used in aromatic polyamides, polyolefins, and polyesters.

Such materials as organic acids that are solids at room temperature, inorganic materials (e.g., ceramics, metal nitrides, and carbon black), and metallic materials (e.g., silver, copper, aluminum, and tin), have been attached to the surfaces of structures to be electrified. In a variation, the surfaces of fibrous webs have been subjected to a blast of a particle-containing aerosol or to metallic vapor deposition so as to provide solid discontinuous particles at the surfaces. Th webs then are electrified.

Most of the known polymeric electrets are composed solely of a nonpolar or polar polymeric material or binary electrets comprising a nonpolar polymer and a polar polymer. Binary electrets, comprising both types of polymers, have been developed and produced so as to utilize the merits of both the polar and nonpolar polymers and provide electrets retaining the excellent characteristics of both the polymers. It is known that a blend system, in which a nonpolar polymer is a matrix and a polar polymer is a domain, is superior as an electret over a blend system of a reverse structure, in which a polar polymer is a matrix and a nonpolar polymer is a domain.

SUMMARY OF THE INVENTION

The present invention teaches a new way to impart locally large electric fields to fibers. If ferroelectric colloids, which possess permanent electric dipole moments, ar introduced into a fiber, the fiber will acquire locally large electric fields. The filtration efficiency of a web made from such fibers is thus enhanced. The filtration efficiency of such a web may be further enhanced by treating the web in the presence of a high-intensity electric field (electret or corona treating).

Thus, the present invention addresses some of the difficulties and problems discussed above by providing a fiber which includes a thermoplastic polymer and particles of a ferroelectric material dispersed therein. The thermoplastic polymer may be, by way of example only, a polyolefin, such as polypropylene or polyethylene. Examples of ferroelectric materials include, by way of illustration only, perovskites, tungsten bronzes, bismuth oxide layered materials, pyrochlores, alums, Rochelle salts, dihydrogen phosphates, dihydrogen arsenates, and colemanites. For example, the ferroelectric material may be a perovskite, tungsten bronze, bismuth oxide layered material, or pyrochlore. As another example, the ferroelectric material may be barium titanate. In general, the ferroelectric material may be present at a level of from about 0.01 to about 50 percent by weight, based on the weight of the fiber. On a percent by volume basis, the ferroelectric material may be present in the fiber at a level of from about 0.001 to about 13. Desirably, the ferroelectric material will have a longest dimension in a range of from about 10 nanometers to about 10 micrometers. Additionally, the fiber may be exposed to an electric field.

The fiber generally may have any desired shape. Thus, the fiber may be circular in cross section, bilobal, trilobal, or any other desired configuration. Additionally, the fiber may be a multicomponent fiber comprised of two or more components, each of which includes a thermoplastic polymer, with at least one component also including particles of a ferroelectric material dispersed in the thermoplastic polymer. For example, the multicomponent fiber may be a bicomponent fiber in which the two components are arranged in a side-by-side configuration. Alternatively, the components may be arranged in a sheath-core configuration.

The fiber may be continuous or discontinuous. The fiber also may be a monofilament or a plurality of monofilaments. If desired, the plurality of monofilaments may be braided, twisted, or false twisted. If desired, a plurality of the fibers or monofilaments may be employed to form a knitted or woven fabric or a nonwoven web.

The present invention also provides a method of preparing fibers containing particles of a ferroelectric material which includes:

destructuring the ferroelectric material in the presence of a liquid and a surfactant to give destructured particles, wherein the liquid is a solvent for the surfactant and the surfactant is adapted to stabilize the destructured particles against agglomeration;

forming a blend of the stabilized, destructured ferroelectric material particles and a thermoplastic polymer; and extruding the blend to form fibers.

If desired, the method may include exposing the fibers to an electric field. Additionally or alternatively, the extruded fibers may be collected on a moving foraminous support to form a nonwoven web. The nonwoven web thus obtained may be exposed to an electric field.

Extrusion of the blend may be accomplished by any known means, including, but not limited to, melt extrusion, solution spinning, and gel spinning. For example, the blend of the stabilized, destructured ferroelectric material particles and a thermoplastic polymer may be melted and the resulting molten blend melt extruded to form fibers. As another example, a solvent for the thermoplastic polymer may be added to the blend to form a solution of the thermoplastic polymer having dispersed therein the stabilized, destructured ferroelectric material particles. The resulting solution then may be solution spun in accordance with known procedures to form fibers.

The method further may include, after destructuring the ferroelectric material, adding the mixture of liquid and stabilized, destructured ferroelectric material particles to a molten organic wax at a temperature sufficient to evaporate the liquid. Alternatively, after destructuring the ferroelectric material, the liquid may be removed from the stabilized, destructured particles and the stabilized, destructured particles then may be added to a molten organic wax.

If desired, after destructuring the ferroelectric material, the liquid may be removed from the stabilized, destructured particles and the particles then may be redispersed in water. The resulting aqueous dispersion then may be added to a molten organic wax at a temperature sufficient to evaporate the water.

In certain desired embodiments of the method of the present invention:

the thermoplastic polymer is polypropylene; the liquid is an aliphatic alcohol having no more than about 6 carbon atoms;

the surfactant is an alcohol-soluble, tetraalkylammonium halide; an ethoxylated alkylamine; or a primary, secondary, or tertiary alkyl- or arylamine;

destructuring is accomplished by means of a ball mill, attriter mill, or pin mill;

removal of the liquid is achieved by evaporation under reduced pressure; and the organic wax is a polyethylene wax.

By way of example, the ferroelectric material may be barium titanate and the aliphatic alcohol may be 2-propanol or 1-butanol.

The fiber of the present invention, especially when in the form of a nonwoven web, is especially suited as a filtration medium. By way of illustration, the nonwoven web may be adapted to enhance the removal of particulate matter from a gaseous stream. For example, the nonwoven web may be a component of an air filter, such as a heating, ventilating, and air conditioning filter; an air conditioning or heating filter; a high efficiency particle abstraction (HEPA) filter; and an automotive air filter, such as an automobile engine air filter and an automobile cabin air filter. As another example, the nonwoven web may be a component of a respirator and a face mask, such as a medical mask, examples of which are a surgical mask and a mask to protect an individual against air-borne allergens. An air filter including a nonwoven web of the present invention may be used to purify the air contained within a clean room, air which is to be supplied to buildings (particularly to hospitals, electronics plants or precision factories, where dust concentrations in the air must be kept low), or gas discharged by factories. The air filter also may be a component of an air cleaner or a vacuum cleaner, for example, a component of a vacuum bag. The filtration efficiency of the nonwoven web generally is enhanced by exposure to an electric field. The electret materials thus obtained by the present invention additionally may be suitably used as wiping materials, e.g., a dust wipe, absorbing materials, or materials for dust-protecting clothes.

DETAILED DESCRIPTION OF THE INVENTION

Figure 1:
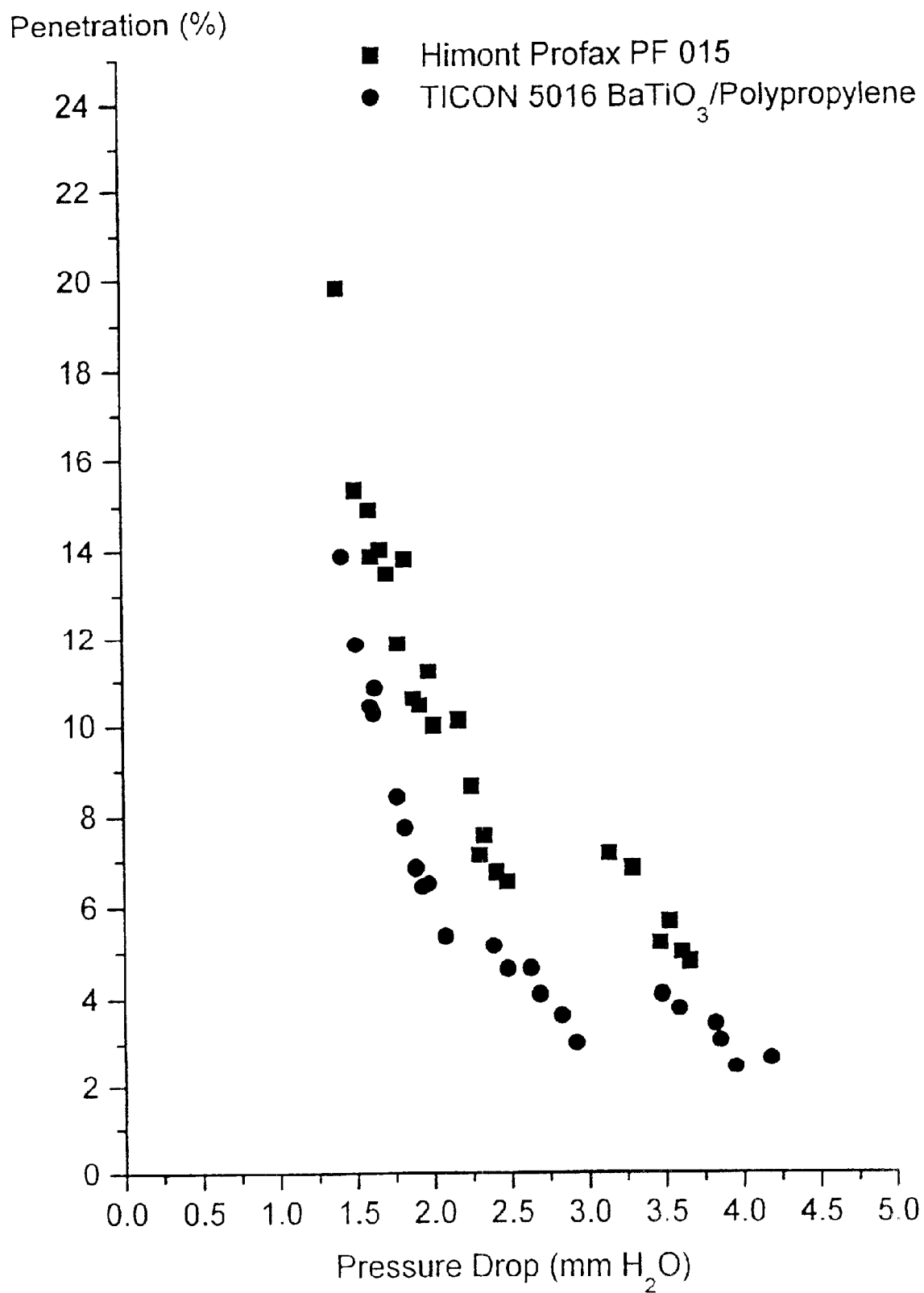
FIGS. 1 and 2 are plots of percent penetration versus pressure drop in mm water for the various nonwoven webs of Example 1.

As used herein, the term "thermoplastic polymer" refers to a polymer that softens when exposed to heat and returns to its original condition when cooled to room temperature. The thermoplastic polymer may be natural or synthetic. Examples of thermoplastic polymers include, by way of illustration only and without limitation, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(ε-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenyleneoxy-1,4-phenylenesulfonyl-4,4'-biphenylene); polycarbonates, such as poly(bisphenol A) carbonate or poly(carbonyldioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; and copolymers of the foregoing, such as acrylonitrile-butadiene-styrene (ABS) copolymers, ethylene-propylene copolymers, and ethylene-vinyl acetate copolymers.

The term "polyolefin" is used herein to mean addition polymers prepared from one or more unsaturated monomers which contain only carbon and hydrogen, examples of which are the polyolefins listed above. In addition, such term is meant to include blends of two or more polyolefins and random, block, and graft copolymers prepared from two or more different unsaturated monomers. Because of their commercial importance, the most desired polyolefins are polyethylene and polypropylene.

The term "ferroelectric material" is used herein to mean a crystalline material which possesses a spontaneous polarization which may be reoriented by the application of an electric field. The term includes any phase or combination of phases exhibiting a spontaneous polarization, the magnitude and orientation of which can be altered as a function of temperature and externally applied electric fields. The term also is meant to include a single ferroelectric material and mixtures of two or more ferroelectric materials of the same class or of different classes. The term further includes a "doped" ferroelectric material, i.e., a ferroelectric material which contains minor amounts of elemental substituents, as well as solid solutions of such substituents in the host ferroelectric material.

The structure of crystalline materials typically is described in terms of 32 distinct symmetry groups. Of these, 21 are noncentrosymmetric. That is, they do not possess a center of symmetry. Of the noncentrosymmetric groups, 20 are piezoelectric, and of these 20, only 10 are referred to as being pyroelectric. Pyroelectric materials ar unique in that they possess a spontaneous electrical polarization which is directly attributable to permanent dipoles which exist on the unit cell level within individual crystals. The alignment of dipoles along a crystallographic axis of the material yields a net spontaneous polarization in the material. Pyroelectric materials also are referred to as polar solids. As the name implies, "pyroelectric" refers to changes in the magnitude and direction of the spontaneous polarization with changes in temperature. Ferroelectric materials are a subgroup of the spontaneously polarized pyroelectric materials. The magnitude and direction of the spontaneous polarization in ferroelectric materials respond to both temperature and the presence of externally applied electric fields.

All ferroelectric materials exhibit a "Curie point" or "Curie temperature," which refers to a critical temperature above which the spontaneous polarization vanishes. The Curie temperature often is indicated herein as "$T_c$".

Examples of ferroelectric materials include, without limitation, perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, colemanite, and thiourea. Thus, ferroelectric materials may be inorganic or organic in nature. Inorganic ferroelectric materials are desired because of their generally superior thermal stabilities. Several of the more useful of these classes are reviewed in detail below.

Perovskites

Perovskites are mixed metal oxides of $ABO_3$ stoichiometry. Perovskites have a very simple cubic structure made up of corner-sharing oxygen octahedra with small, highly-charged cations like titanium (Ti), tin (Sn), zirconium (Zr), niobium (Nb), tantalum (Ta), and tungsten (W) occupying the central octahedral B site, and lower charged, large cations like sodium (Na), potassium (K), rubidium (Rb), calcium (Ca), strontium (Sr), Barium (Ba), and lead (Pb), etc., filling the interstices between the oxygen octahedra in the larger 12-coordinated A sites. The ferroelectricty associated with these materials arises from lattice distortions, occurring below the Curie temperature, which result in the development of very large dipoles within the crystals.

Perovskites are unique in their ability to form a wide variety of solid solutions, from simple binary and ternary solutions to very complex multicomponent solutions. Some examples include, but are not limited to, $BaSrTiO_3$, $KBaTiO_3$, $Pb(Co_{0.25}Mn_{0.25}W_{0.5})O_3$, and numerous forms of barium titanate and lead titanate doped with niobium oxide, antimony oxide, and lanthanum oxide, to name a few by way of illustration only. Th ability to form extensive solid solutions of perovskite-type compounds allows one skilled in the art to systematically alter the electrical properties of the material by formation of a solid solution or addition of a dopant phase. For example, the Curie temperature of Barium titanate ($BaTiO_3$) can be systematically increased from 130° C. to 490° C. by substituting lead ions for barium ions, the upper limit of $T_c$ being reached at 100 percent lead ion substitution. Likewise, it generally is known that the T, of barium titanate can be gradually decreased by substituting strontium ions for barium ions.

Perovskite-Related Octahedral Structures

These materials have a structure similar to that of perovskites, except that the oxygen octahedra are edge sharing rather than corner sharing. Only two materials in this class are of note, namely, lithium niobate ($LiNbO_3$) and lithium tantalate ($LiTaO_3$). For convenience, these materials are included in the term "perovskites."

Tungsten Bronzes

The tungsten bronzes are non-stoichiometric substances having the general formula $M_n'WO_3$, where $0<n\leq 1$ and M is a monovalent metal cation, most typically sodium (Na). The ferroelectric tungsten bronzes typically have values of $n\leq 0.3$. Within this family of materials are such compounds as lead metaniobate ($PbNb_2O_6$) and lead metatantalate ($PbTa_2O_6$).

Bismuth Oxide Layered Materials

These are complex layered structures of perovskite layers interleaved with bismuth oxide layers. A typical bismuth oxide layered compound is lead bismuth niobate ($PbBiNb_2O_9$).

Pyrochlores

Pyrochlores are corner sharing oxygen octahedra similar to the perovskites. However, this family of compounds is more limited in the cation substitutions which can be made. Typical pyrochlores are cadmium niobate and tantalate and lead niobate and tantalate. These materials have Curie temperatures below 200° K (−73° C.), which may limit their usefulness for some applications.

The term "destructured" and variations thereof means a reduction in size of the ferroelectric particles. The terms "particles" and "agglomerated particles" are intended to mean particles of a ferroelectric material which have not been processed to reduce particle sizes. The term "destructured particles" refers to "particles" or "agglomerated particles" which have been processed, or "destructured," to reduce particle sizes.

As used herein, the term "electric field" means an electric field generated by any method known to those having ordinary skill in the art for charging nonconductive webs. Such methods include, for example, thermal, liquid contact, electron beam, and corona discharge methods. For example, corona discharge charging of nonconductive webs is described in U.S. Pat. No. 4,588,537 to Klaase et al., the contents of which regarding the charging of webs is incorporated herein by reference. As another example, charging of nonconductive webs between the surface of a grounded metal electrode and a series of discharge electrodes is described in U.S. Pat. No. 4,592,815 to Makao, the contents of which regarding the charging of webs is incorporated herein by reference.

One technique of interest for the charging of webs involves applying high voltage electric fields via direct current to form an electret or electrical charge. This "cold-charging" technique is described in U.S. Pat. No. 5,401,446 to Tsai et al., which patent is incorporated herein by reference. In general, the technique involves subjecting a material to a pair of electrical fields wherein the electrical fields have opposite polarities. For example, the permeable material may be charged by sequentially subjecting the material to a series of electrical fields such that adjacent electrical fields have substantially opposite polarities with respect to each other. Thus, one side of the material is initially subjected to a positive charge while the other side of the material is initially subjected to a negative charge. Then, the first side of the material is subjected to a negative charge and the other side of the material is subjected to a positive charge.

It is important to note that the terms "positive" and "negative" are meant to be relative terms. For example, a pair of electrodes will have a positive electrode and a negative electrode any time there is a difference in potential between the two electrodes. In general, the positive electrode will be the electrode with the more positive (or less negative) potential, while the negative electrode will be the electrode with the more negative (or less positive) potential.

The strength of the electrical field used to charge the material may vary and can be appropriately determined by those of ordinary skill in the art. As a practical matter, the strength of the electrical field may vary from about 1 kV/cm to about 30 kV/cm. For example, the strength of the electrical field may vary from about 4 kV/cm to about 12 kV/cm.

The term "melt extrusion" and variations thereof is meant to include any process by which a thermoplastic polymer composition is heated to a molten state and forced through a die to form a shaped article, such as, but not limited to, a fiber.

As used herein, the term "solution spinning" means the formation of fibers by extruding a solution of a polymer composition from a die to form fine streams of fluid and includes both dry spinning and wet spinning. With dry spinning, the amount of polymer solvent is relatively low, so that the solvent evaporates quickly, thereby forming a fiber from each fluid stream. Wet spinning is similar to dry spinning, except that the solvent level is higher and the fluid streams are extruded into water (or other liquid) which extracts the solvent. See, by way of illustration only, H. F. Mark et al., Editors, "Encyclopedia or Polymer Science and Engineering," Vol. 6, John Wiley & Sons, New York, 1986, pp. 802–821.

As used herein, the term "nonwoven web" means a web of fibers in which the fibers are laid down in a random manner. Thus, a nonwoven web may be formed by such processes as wet laying, dry laying, meltblowing, coforming, spunbonding, and carding and bonding.

A nonwoven web desirably may be prepared by a melt-extrusion process in which melt-extrusion to form fibers is followed concurrently by web formation on a foraminous support. Such processes include, among others, meltblowing, coforming, and spunbonding. By way of illustration only, such processes are exemplified by the following references:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

The term "organic wax" is used herein to mean a material which may be a liquid, semisolid, or solid at ambient temperature, i.e., at a temperature of 20–25° C. Typical liquids include, by way of example only, low weight-average molecular weight ($M_w$) oligomeric forms of polyethylene, polypropylene, and polyisobutylene. Typical semisolids include, again by way of example only, polyisobutylene ($M_w$=100,000) and atactic polypropylene. Typical solids included, further by way of example only, polyethylene ($M_w$=1,000–4,000), polypropylene ($M_w$=1,000–4,000), and various carboxylate-, amide-, and alcohol-based waxes. The choice of organic wax generally will be dictated by the thermoplastic polymer in which the destructured ferroelectric material is to be dispersed.

As stated earlier, the present invention provides a fiber which includes a thermoplastic polymer and particles of a ferroelectric material dispersed therein. In general, the thermoplastic polymer may be any thermoplastic polymer which is capable of being formed into fibers. Desirably, the thermoplastic polymer will be a polyolefin, i.e., an addition polymer prepared from one or more unsaturated monomers which contain only carbon and hydrogen. Examples of polyolefins include polyethylene, polypropylene, poly(1-butene), poly(2-butene), poly(1-pentene), poly(2-pentene), poly(3-methyl-1-pentene), and poly(4-methyl-1-pentene). In addition, the term "polyolefin" includes blends of two or more polyolefins and random, block, and graft copolymers prepared from two or more different unsaturated monomers. Because of their commercial importance, the most desired polyolefins are polyethylene and polypropylene.

Dispersed in the thermoplastic polymer are particles of a ferroelectric material. That is, the particles of the ferroelectric medium are distributed throughout the fiber volume. The distribution of particles is substantially uniform in the sense that agglomerates of particles are not present adjacent to large regions of the fiber volume which are devoid of particles. The particles ar distributed in a random fashion, meaning that no effort is made to regularly space particles within the bulk of the fiber along the fiber axis. Regions may exist where the particles are regularly spaced, but these regions occur by chance rather than by design. The particle loading is expressed as either a weight fraction or volume fraction which is representative of the bulk loading of the ferroelectric material in the polymer from which the fibers are formed.

The amount of the particles of a ferroelectric medium contained in the fiber in general will be in a range of from about 0.01 to about 50 percent by weight, based on the weight of the fiber. For example, the amount of the particles of a ferroelectric material may be in a range of from about 0.05 to about 30 percent by weight. As another example, the amount of the particles of a ferroelectric material may be in a range of from about 0.1 to about 20 percent by weight. As a further example, th amount of such particles may be in a range of from about 0.5 to about 5 percent by weight. On a percent by volume basis, the amount of the particles of a ferroelectric material present in the fiber generally will be in a range of from about 0.001 to about 13 percent by volume. For example, the amount of the particles of a ferroelectric material may be in a range of from about 0.01 to about 8 percent by volume. As another example, the amount of the particles of a ferroelectric material may be in a range of from about 0.1 to about 5 percent by volume. As a further example, the amount of such particles may be in a range of from about 0.1 to about 2 percent by volume.

It will be appreciated by those having ordinary skill in the art, as demonstrated by the examples, that amounts of the materials necessary to prepare fibers coming within the scope of the present invention, e.g., the thermoplastic polymer and ferroelectric material, are conveniently measured on a weight basis. However, the percent by volume of the particles of the ferroelectric material present in the fiber is the more significant parameter.

In general, there needs to be a sufficiently high level of thermoplastic polymer in order to provide a continuous matrix which will result in a fiber having the desired tensile strength characteristics. That is, the strength of a fiber in large measure is a function of the strength of the continuous matrix of which the fiber is composed. Thus, the percent-by-volume ranges for the particles of the ferroelectric material given herein provide sufficient guidance to one having ordinary skill in the art so that a sufficiently strong fiber may be obtained without undue experimentation being required.

In general, any size particles of the ferroelectric material may be employed in the present invention, provided the particles are of a size which will not significantly adversely affect fiber formation. For example, the longest dimension of the particles typically should be no greater than about 50 percent of the diameter of the orifice through which the blend is to extruded. Desirably, the ferroelectric material will have a longest dimension in a range of from about 10 nanometers to about 10 micrometers.

Many ferroelectric materials are available as agglomerations of what ar referred to herein as primary particles. These agglomerated particles may have longest dimensions which are greater than about 10 microns. When fibers having relatively large diameters are being prepared, such as those obtained from a spunbonding process, the dimensions of the agglomerated particles in general do not significantly adversely affect fiber formation. However, when fibers having smaller diameters are to be prepared, such as those which may be obtained from a meltblowing process in which fiber diameters may be in a range of from about 0.1 to about 10 micrometers, the agglomerated particles should be destructured. Of course, the particles may be destructured if desired, regardless of the diameters of the fibers to be prepared.

The particles of ferroelectric material may be destructured by any means known to those having ordinary skill in the art. For example, destructuring may be accomplished by subjecting the ferroelectric material to processing in a ball mill, attriter mill, or pin mill. Although processing conditions will vary, depending upon the design and operation of the mill employed, suitable conditions may be readily determined by those having ordinary skill in the art. As already noted, destructuring is carried out in the presence of a liquid and a surfactant, wherein the liquid is a solvent for the surfactant and the surfactant is adapted to stabilize the destructured particles against agglomeration.

The fiber generally may have any desired shape. Thus, the fiber may be circular in cross section, bilobal, trilobal, or any other desired configuration. Additionally, the fiber may be a multicomponent fiber comprised of two or more components, each of which include a thermoplastic polymer, with at least one component including a thermoplastic polymer and particles of a ferroelectric material dispersed therein. For example, the multicomponent fiber may be a bicomponent fiber in which the two components are arranged in a side-by-side configuration. Alternatively, the components may be arranged in a sheath-core configuration.

The fiber may be continuous or discontinuous. The fiber also may be a monofilament or a plurality of monofilaments. If desired, the plurality of monofilaments may be braided, twisted, or false twisted. If desired, a plurality of the fibers or monofilaments may be employed to form a knitted or woven fabric or a nonwoven web.

The present invention also provides a method of preparing fibers containing particles of a ferroelectric material, which method includes:
- destructuring the ferroelectric material in the presence of a liquid and a surfactant to give destructured particles, wherein the liquid is a solvent for th surfactant and the surfactant is adapted to stabilize the destructured particles against agglomeration;
- forming a blend of the stabilized, destructured ferroelectric material particles and a thermoplastic polymer; and
- extruding the blend to form fibers.

If desired, the method may include exposing the fibers to an electric field. Additionally or alternatively, the extruded fibers may be collected on a moving foraminous support to form a nonwoven web. The nonwoven web thus obtained may be exposed to an electric field.

In general, any liquid may be employed which is a solvent for the surfactant. The surfactant, in turn, is adapted to stabilize the destructured particles against agglomeration. Suitable liquids include, by way of example only, aliphatic hydrocarbons, such as hexane, heptane, octane, and decane; aromatic hydrocarbons, such as xylene, toluene, and cumene; aliphatic alcohols, such as 2-propanol, 1-butanol, 1-hexanol, and benzyl alcohol; aliphatic ketones, such as methyl ethyl ketone; halogenated hydrocarbons, such as dichloromethane, chloroform, carbon tetrachloride, and chlorobenzene; and polar solvents, such as water, tetrahydrofuran, and N,N-dimethylpyrolidinone.

Desirably, the liquid will be an aliphatic alcohol having no more than about ten carbon atoms. Examples of such alcohols include, by way of illustration only, methanol, ethanol, 1-propanol, 2-propanol, 1-butanol, 2-butanol, 1-pentanol, 2-pentanol, 3-pentanol, 2-methylbutanol, 3-methylbutanol, 1-hexanol, 2-hexanol, 3-hexanol, 3,3-dimethylbutanol, 1-heptanol, 1-octanol, 1-nonanol, and 1-decanol.

The types of surfactants which may be employed in the method of the present invention include catonic, anionic, nonionic, and zwitterionic surfactants. In some cases, it may be desirable to use a mixture of two or more surfactants to stabilize the destructured ferroelectric particles. Examples of cationic surfactants include, by way of illustration only, aliphatic and aromatic primary, secondary, and tertiary amines; amine oxides; amide-linked amines; and quaternary ammonium salts. Examples of anionic surfactants include, again by way of illustration only, carboxylic acids and salts; sulfonic acids and salts: lignosulfonates, alkylbenzenesulfonates; alkylarylsulfonates; petroleum sulfonates; sulfonates with ester, ether, or amide linkages; sulfuric acid esters and salts; sulfated alcohols; sulfated ethoxylated alcohols; sulfated ethoxylated alkylphenols; sulfated acids; sulfated amides; sulfated esters; sulfated natural fats and oils; phosphoric acid and polyphosphoric acid esters and salts; phosphated alcohols; phosphated phenols; phosphated alkoxylated alcohols; phosphated alkoxylated phenols; and salts of each class of phosphated anionic surfactant. Examples of nonionic surfactants include, also by way of illustration only, ethoxylated alcohols; ethoxylated alkylphenols; ethoxylated carboxylic acid esters; glycerol esters; polyethylene glycol esters; sorbitol esters; ethoxylated natural fats and oils; ethylene and diethylene glycol esters; propanediol esters; and ethoxylated carboxylic acid amides.

The surfactant generally is employed in an amount sufficient to stabilize the destructured ferroelectric material against agglomeration. For example, the surfactant may be present in a range of from about 0.01 to about 10 percent by weight, based on the total amount of ferroelectric material being destructured and stabilized against agglomeration. Desirably, the surfactant will be present in a range of from about 0.01 to about 1 percent by weight.

A blend of the stabilized, destructured ferroelectric material particles and a thermoplastic polymer may be prepared by a variety of methods. For example, after destructuring the ferroelectric material, the mixture of liquid and stabilized, destructured ferroelectric material particles may be added to a molten organic wax at a temperature sufficient to evaporate the liquid. Alternatively, after destructuring the ferroelectric material, the liquid may be removed from the stabilized, destructured particles and the stabilized, destructured particles then may be added to a molten organic wax.

If desired, the liquid may be removed from the stabilized, destructured particles after destructuring and the particles then may be redispersed in water. The resulting aqueous dispersion then may be added to a molten organic wax at a temperature sufficient to evaporate the water.

The above alternative procedures all result in the dispersion of the stabilized, destructured ferroelectric particles in an organic wax. Such wax dispersion then may be added to the thermoplastic polymer. For example, the wax dispersion may be physically blended with thermoplastic polymer pellets at a temperature sufficient to maintain the wax in a molten condition. The resulting blend may be further blended in, for example, a twin-screw extruder to give pellets composed of the thermoplastic polymer and the stabilized, destructured particles of ferroelectric material.

Extrusion of the blend may be accomplished by any known means. For example, the blend of the stabilized, destructured ferroelectric material particles and a thermoplastic polymer may be melted prior to extruding the blend to form fibers. As another example, a solvent for the thermoplastic polymer may be added to the blend to form a solution of the thermoplastic polymer having dispersed therein the stabilized, destructured ferroelectric material particles prior to extruding the blend to form fibers. Thus, the fibers may be formed by melt extrusion or solution spinning.

In certain desired embodiments of the method of the present invention:
- the thermoplastic polymer is polypropylene;
- the liquid is an aliphatic alcohol having no more than about ten carbon atoms;
- the surfactant is an alcohol-soluble, tetraalkylammonium halide; an ethoxylated alkylamine; or a primary, secondary, or tertiary alkyl- or arylamine;
- destructuring is accomplished by means of a ball mill, attriter mill, or pin mill; and
- the organic wax is a polyethylene wax.

By way of example, the ferroelectric material may be barium titanate and the aliphatic alcohol may be 2-propanol or 1-butanol.

The fiber of the present invention, especially when in the form of a nonwoven web, is especially suited as a filtration medium. For example, the nonwoven web may be adapted to remove particulate matter from a gaseous stream.

The present invention is further described by the examples which follow. Such examples, however, are not to be construed as limiting in any way either the spirit or the scope of the present invention.

EXAMPLE 1

Material Preparation

A nonwoven web, made up of fibers composed of a thermoplastic polymer and having dispersed throughout the bulk of the fibers particles of a ferroelectric material, was prepared in a four-step process. The steps were (1) destructured particle preparation, (2) dispersion in low molecular weight polyethylene wax, (3) blending or compounding of the wax dispersion in polypropylene, and (4) nonwoven fabric formation.

Destructured Particle Preparation

Dispersions were prepared using two grades of barium titanate ($BaTiO_3$) supplied by Tam Ceramics, Inc. (Niagara Falls, N.Y.) under the product names TICON® 5016 and TICON® HPB. Each dispersion was prepared by ball milling the barium titanate with 2-propanol and a stabilizing surfactant. The surfactant was an ethoxylated tallow amine (RHODAMEEN® PN-430, Rhone-Poulenc, Cranberry, N.J.). In a typical batch, approximately 1 kg of barium titanate was vigorously stirred with 2.6 L of 2-propanol and 4–5 mL of the surfactant. The resulting slurry was poured into a 6.2-L Roalox ceramic mill jar (U.S. Stoneware, East Palestine, Ohio) which had been charged with 12 lbs (about 5.4 kg) of BORUNDUM® (87 percent alumina) grinding media (U.S. Stoneware). The jar was rolled at 70 rpm for a period of 48 hours on a U.S. Stoneware Unitized Jar Mill, Model 764AVM.

At the end of the milling period, the resulting dispersion of stabilized, destructured barium titanate was removed from the jar. The 2-propanol was removed by evaporation under reduced pressure and the resulting semi-dry powder was further dried at 90° C. for 4 hours under reduced pressure. In total, 50 lbs (about 22.7 kg) of each type of barium titanate were destructured and stabilized as described above. Two 100-lb dispersions in deionized water containing about 50 percent by weight solids were prepared from the vacuum-dried barium titanates.

Wax Dispersion Preparation

In general, a low molecular weight polyethylene wax was melted in a vat equipped with hydraulically driven interleaving blades. The blades functioned to shear-mix the molten wax with the aqueous suspension. The shear-mixing accelerated the rate of water evaporation and blended the dispersed particles with the wax. The vat was heated with steam at 38 psig to 48 psig, corresponding to a temperature range of 140° C. to 147° C.

Specifically, approximately 100 lbs (about 45 kg) of 50 weight percent aqueous barium titanate was dispersed into 12.5 lbs (about 5.7 kg) of polyethylene wax (AC 16, Allied Signal, Inc., Morristown, N.J.). The barium titanate/surfactant/wax dispersions contained less than 0.1 weight percent residual water as determined by Karl Fischer titration. The actual compositions of the two wax dispersions are given in Table 1, below. The wax dispersions were cooled to dry ice temperature and ground to a coarse powder for dry blending with polypropylene.

TABLE 1

Compositions of Wax Dispersions

| Code | Type | Barium Titanate Amount[a] | Amount Wax[a] |
|---|---|---|---|
| WD-A | Ticon 5016 ® barium titanate | 54.7 (24.8) | 13.7 (6.2) |
| WD-B | Ticon HPB ® barium titanate | 53.6 (24.3) | 13.4 (6.1) |

[a]Lbs (kg)

Polypropylene Compounding

The two wax dispersions were separately dry blended with Himont PROFAX® PF-015 polypropylene (Montell Polymers, Wilmington, Del.). The mixture was melt blended using a single screw compounding extruder. The compositions of the two blends are given in Table 2.

TABLE 2

Polypropylene/Barium Titanate Formulations

| Code | WD Code | Weight[a] Wax Dispersion | Weight[a] Polymer | $BaTiO_3$ Concn.[b] |
|---|---|---|---|---|
| PF-A | WD-A | 68.4 (31) | 3619 (1642) | 1.5 (0.25) |
| PF-B | WD-B | 67.0 (30) | 3123 (1418) | 1.7 (0.3) |

[a]Lbs (kg).
[b]Percent by weight (percent by volume).

Nonwoven Fabric Formation

Nonwoven fabrics were manufactured on a 100-inch (about 2.5-meter) meltblown line essentially as described in U.S. Pat. No. 3,849,241 to Buntin et al., which is incorporated herein by reference. The 100-inch wide web was slit into five 20-inch (about 51-cm) sections. Of these, the outer 20 inches (about 51 cm) on either side of the web were discarded. The remaining three slits represent cross deckle positions from 20 inches (about 51 cm) through 80 inches (about 203 cm). Meltblowing conditions were the same for all materials. The line speed was varied to alter the basis weight. Basis weights of 0.5 ounces per square yard or osy (about 17 grams per square meter or gsm), 0.6 osy (about 20 gsm), 0.75 osy (about 25 gsm), and 1.0 osy (about 34 gsm) were spun from the PROFANE PF-015 polypropylene alone (the control, coded PP-A) and from each formulation containing barium titanate (see Table 2). All basis weights of meltblown webs were electret treated on-line under identical conditions. The electret treatment was carried out in accordance with the teachings of U.S. Pat. No. 5,401,446, described earlier.

Results

Air Filtration Measurements

The air filtration efficiencies of the meltblown nonwoven webs prepared above were evaluated using a TSI, Inc. (St. Paul, Minn.) Model 8110 Automated Filter Tester (AFT). The Model 8110 AFT measures pressure drop and particle filtration characteristics for air filtration media. The AFT utilizes a compressed air nebulizer to generate a submicron aerosol of sodium chloride particles which serves as the challenge aerosol for measuring filter performance. The characteristic size of the particles used in these measurements was 0.1 micrometer. Typical air flow rates were between 31 liters per minute and 33 liters per minute. The AFT test was performed on a sample area of about 140 cm$^2$. The performance or efficiency of a filter medium is expressed as the percentage of sodium chloride particles which penetrate the filter. Penetration is defined as transmission of a particle through the filter medium. The transmitted particles were detected downstream from the filter. The percent penetration (% P) reflects the ratio of the downstream particle count to the upstream particle count. Light scattering was used for the detection and counting of the sodium chloride particles.

Samples of meltblown material were taken from six cross-deckle (CD) positions (i.e., 2 per 20-inch wide slit) of the nonwoven webs described in the preceding section. A sample of material is defined as a flat nonwoven web of a characteristic basis weight cut to approximately 8 inches (about 20 cm) square. Typically, 15–20 samples from each position were evaluated for pressure drop (Δp in mm water) and percent particle penetration (% P). Tables 3–5 summarize the pressure drop and particle penetration data for the control and each barium titanate/polypropylene formulation.

TABLE 3

Air Filtration Results for Control Webs

| CD[a] | BW[b] | Pressure Drop[c] | σ(Δp)[d] | % P | σ(% p)[e] |
|---|---|---|---|---|---|
| 25 (64) | 0.5 (17) | 1.61 | 0.06 | 13.84 | 1.52 |
| 35 (89) | 0.5 (17) | 1.60 | 0.05 | 14.88 | 1.24 |
| 45 (114) | 0.5 (17) | 1.78 | 0.07 | 11.85 | 0.85 |
| 55 (140) | 0.5 (17) | 1.67 | 0.06 | 14.00 | 2.07 |
| 65 (165) | 0.5 (17) | 1.51 | 0.07 | 15.32 | 1.67 |
| 75 (190) | 0.5 (17) | 1.40 | 0.05 | 19.79 | 1.65 |

TABLE 3-continued

Air Filtration Results for Control Webs

| CD[a] | BW[b] | Pressure Drop[c] | σ(Δp)[d] | % P | σ(% p)[e] |
|---|---|---|---|---|---|
| 25 (64) | 0.6 (20) | 1.88 | 0.08 | 10.57 | 1.37 |
| 35 (89) | 0.6 (20) | 1.92 | 0.09 | 10.43 | 0.87 |
| 45 (114) | 0.6 (20) | 2.01 | 0.08 | 9.98 | 0.66 |
| 55 (140) | 0.6 (20) | 1.98 | 0.08 | 11.20 | 1.15 |
| 65 (165) | 0.6 (20) | 1.83 | 0.09 | 13.78 | 1.10 |
| 75 (190) | 0.6 (20) | 1.71 | 0.05 | 13.45 | 0.87 |
| 25 (64) | 0.75 (25) | 2.30 | 0.12 | 7.12 | 0.88 |
| 35 (89) | 0.75 (25) | 2.41 | 0.07 | 6.72 | 0.84 |
| 45 (114) | 0.75 (25) | 2.48 | 0.08 | 6.52 | 0.59 |
| 55 (140) | 0.75 (25) | 2.33 | 0.08 | 7.54 | 0.78 |
| 65 (165) | 0.75 (25) | 2.25 | 0.09 | 8.63 | 1.01 |
| 75 (190) | 0.75 (25) | 2.17 | 0.08 | 10.09 | 0.77 |
| 25 (64) | 1.0 (34) | 3.47 | 0.14 | 5.19 | 0.46 |
| 35 (89) | 1.0 (34) | 3.61 | 0.11 | 4.99 | 0.42 |
| 45 (114) | 1.0 (34) | 3.66 | 0.17 | 4.77 | 0.57 |
| 55 (140) | 1.0 (34) | 3.53 | 0.16 | 5.65 | 0.84 |
| 65 (165) | 1.0 (34) | 3.29 | 0.10 | 6.81 | 0.93 |
| 75 (190) | 1.0 (34) | 3.14 | 0.07 | 7.14 | 0.49 |

[a]Cross-deckle position, inches (cm).
[b]Basis weight, osy (gsm).
[c]In mm water.
[d]Standard deviation of pressure drop measurements.
[e]Standard deviation of percent penetration measurements.

TABLE 4

Air Filtration Results for PF-A Webs

| CD[a] | BW[b] | Pressure Drop[c] | σ(Δp)[d] | % P | σ(% p)[e] |
|---|---|---|---|---|---|
| 25 (64) | 0.5 (17) | 1.60 | 0.07 | 10.40 | 0.65 |
| 35 (89) | 0.5 (17) | 1.63 | 0.05 | 10.83 | 0.81 |
| 45 (114) | 0.5 (17) | 1.77 | 0.08 | 8.41 | 0.78 |
| 55 (140) | 0.5 (17) | 1.62 | 0.06 | 10.25 | 1.21 |
| 65 (165) | 0.5 (17) | 1.51 | 0.08 | 11.84 | 1.48 |
| 75 (190) | 0.5 (17) | 1.42 | 0.06 | 13.85 | 1.21 |
| 25 (64) | 0.6 (20) | 1.89 | 0.08 | 6.83 | 0.96 |
| 35 (89) | 0.6 (20) | 1.97 | 0.10 | 6.50 | 0.87 |
| 45 (114) | 0.6 (20) | 2.08 | 0.07 | 5.35 | 0.75 |
| 55 (140) | 0.6 (20) | 1.93 | 0.07 | 6.43 | 0.91 |
| 65 (165) | 0.6 (20) | 1.82 | 0.07 | 7.74 | 0.88 |
| 75 (190) | 0.6 (20) | 1.77 | 0.06 | 8.39 | 0.61 |
| 25 (64) | 0.75 (25) | 2.63 | 0.10 | 4.64 | 0.84 |
| 35 (89) | 0.75 (25) | 2.83 | 0.09 | 3.60 | 0.40 |
| 45 (114) | 0.75 (25) | 2.92 | 0.16 | 2.99 | 0.32 |
| 55 (140) | 0.75 (25) | 2.69 | 0.06 | 4.06 | 0.53 |
| 65 (165) | 0.75 (25) | 2.48 | 0.11 | 4.63 | 0.66 |
| 75 (190) | 0.75 (25) | 2.39 | 0.06 | 5.14 | 0.37 |
| 25 (64) | 1.0 (34) | 3.82 | 0.15 | 3.41 | 0.34 |
| 35 (89) | 1.0 (34) | 4.18 | 0.16 | 2.63 | 0.28 |
| 45 (114) | 1.0 (34) | 3.95 | 0.16 | 2.43 | 0.24 |
| 55 (140) | 1.0 (34) | 3.85 | 0.14 | 3.04 | 0.31 |
| 65 (165) | 1.0 (34) | 3.59 | 0.11 | 3.75 | 0.45 |
| 75 (190) | 1.0 (34) | 3.48 | 0.10 | 4.06 | 0.29 |

[a]Cross-deckle position, inches (cm).
[b]Basis weight, osy (gsm).
[c]In mm water.
[d]Standard deviation of pressure drop measurements.
[e]Standard deviation of percent penetration measurements.

TABLE 5

Air Filtration Results of PF-B Webs

| CD[a] | BW[b] | Pressure Drop[c] | σ(Δp)[d] | % P | σ(% p)[e] |
|---|---|---|---|---|---|
| 25 (64) | 0.5 (17) | 1.51 | 0.08 | 10.45 | 1.26 |
| 35 (89) | 0.5 (17) | 1.52 | 0.07 | 11.17 | 1.79 |
| 45 (114) | 0.5 (17) | 1.61 | 0.09 | 9.41 | 1.40 |
| 55 (140) | 0.5 (17) | 1.50 | 0.07 | 10.89 | 1.35 |
| 65 (165) | 0.5 (17) | 1.42 | 0.06 | 11.91 | 1.55 |
| 75 (190) | 0.5 (17) | 1.36 | 0.06 | 14.27 | 1.70 |
| 25 (64) | 0.6 (20) | 1.97 | 0.07 | 7.24 | 0.58 |
| 35 (89) | 0.6 (20) | 2.04 | 0.06 | 6.69 | 0.93 |
| 45 (114) | 0.6 (20) | 2.04 | 0.05 | 6.60 | 0.73 |
| 55 (140) | 0.6 (20) | 1.96 | 0.09 | 7.06 | 0.60 |
| 65 (165) | 0.6 (20) | 1.79 | 0.09 | 8.54 | 1.00 |
| 75 (190) | 0.6 (20) | 1.76 | 0.06 | 9.45 | 0.78 |
| 25 (64) | 0.75 (25) | 2.57 | 0.10 | 4.07 | 0.43 |
| 35 (89) | 0.75 (25) | 2.72 | 0.10 | 3.96 | 0.48 |
| 45 (114) | 0.75 (25) | 2.77 | 0.10 | 3.48 | 0.48 |
| 55 (140) | 0.75 (25) | 2.60 | 0.10 | 4.10 | 0.51 |
| 65 (165) | 0.75 (25) | 2.43 | 0.08 | 5.11 | 0.53 |
| 75 (190) | 0.75 (25) | 2.39 | 0.07 | 5.72 | 0.50 |
| 25 (64) | 1.0 (34) | 3.76 | 0.10 | 3.63 | 0.21 |
| 35 (89) | 1.0 (34) | 3.88 | 0.13 | 3.56 | 0.47 |
| 45 (114) | 1.0 (34) | 3.99 | 0.14 | 2.84 | 0.26 |
| 55 (140) | 1.0 (34) | 3.77 | 0.12 | 3.38 | 0.42 |
| 65 (165) | 1.0 (34) | 3.51 | 0.14 | 4.48 | 0.58 |
| 75 (190) | 1.0 (34) | 3.38 | 0.12 | 4.43 | 0.19 |

[a]Cross-deckle position, inches (cm).
[b]Basis weight, osy (gsm).
[c]In mm water.
[d]Standard deviation of pressure drop measurements.
[e]Standard deviation of percent penetration measurements.

The pressure drop and percent particle penetration data tabulated in Tables 3–5 clearly contrast the filtration properties of meltblown materials made from the base polypropylene alone and the barium titanate/polypropylene formulations. The data illustrate improved filtration efficiencies at all basis weights. The low basis weight (0.5 osy and 0.6 osy) nonwovens exhibited no change in the pressure drop for filter media prepared using either polypropylene alone or the barium titanate/polypropylene formulations. The higher basis weight (0.75 osy and 1.0 osy) nonwoven filter media exhibited a small increase in pressure drop. Irrespective of this change in pressure drop at the two higher basis weights, media made using the barium titanate-containing formulations always had higher filtration efficiencies when compared to media made from the base polymer alone.

Figure 2:
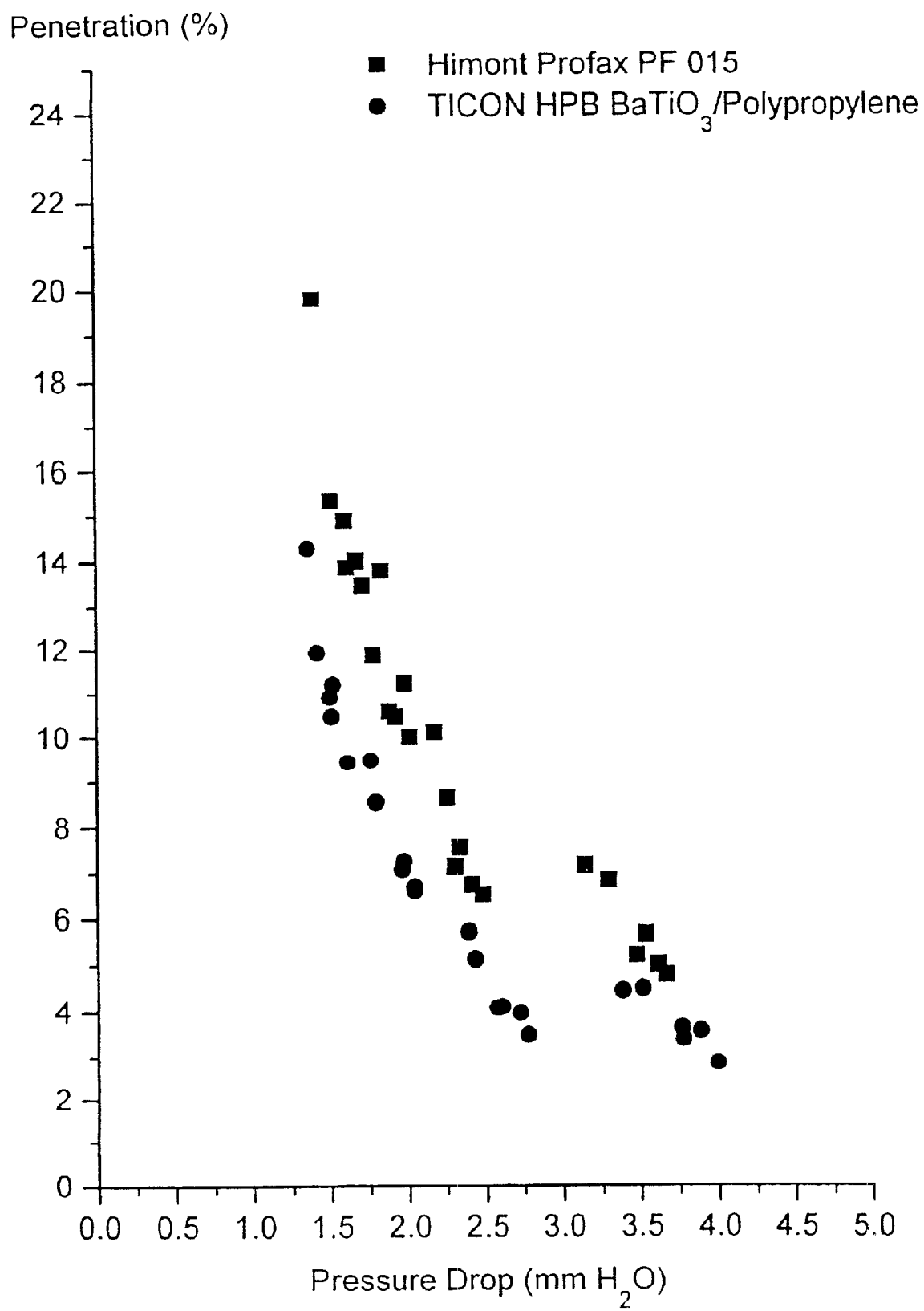

The improved filtration performance of the barium titanate formulations compared to polypropylene alone is best illustrated by the graphs shown in FIGS. 1 and 2. Note that the data points representing the percent penetration versus pressure drop for the barium titanate/polypropylene nonwoven media define a curve which always falls below the curve defined by the data points for the nonwoven media prepared from polypropylene alone. Therefore, for any given pressure drop, nonwoven media made from either of the two barium titanate formulations remove more particles from the air stream compared to nonwoven media made using polypropylene alone.

EXAMPLE 2

Material Preparation

The ferroelectric colloidally enhanced nonwoven fabrics described in this example were prepared using the same procedure described in Example 1. Therefore, only differences in the preparation and treatment of the nonwovens are described below.

Destructured Particle Preparation

Barium titanate was obtained from the Transelco Division of Ferro Corporation (Dresden, N.Y., Product Code 219-9). In this example, didodecyldimethyl-ammonium bromide (DDAB) was the stabilizing surfactant. Typically, 200 g of barium titanate was added to 1 L of 2-propanol and vigorously stirred. Approximately 0.8 g of DDAB was added to the mixture. The slurry was stirred and sonicated (Fisher Scientific Sonifier, Fischer Scientific Company, Philadelphia, Pa.) for approximately 5 minutes. The resulting slurry was poured into a 2-L Roalox ceramic mill jar which was charged with 4.5 lbs (about 2 kg) of BORUNDUM® grinding media (see Example 1). The mill jar was then rolled at 70 rpm for a period of 48 hours on a U.S. Stoneware Unitized Jar Mill, Model 764AVM.

After the milling was complete, the barium titanate/stabilizing surfactant/2-propanol dispersion was removed from the mill jar. The dispersion was poured into a large round-bottomed flask, and the 2-propanol was removed by vacuum evaporation. The semi-dry barium titanate/surfactant solid was further dried at 90° C. for 4 hours under reduced pressure. A sufficient number of 200-g batches were prepared in accordance with this procedure to provide approximately 2 lbs (about 908 g) of surfactant-stabilized barium titanate for dispersion into polypropylene. The stabilized barium titanate was mixed with deionized water to give a 50 percent by weight aqueous dispersion for the next step.

Wax Dispersion Preparation

In this example, 4 lbs (about 1.8 kg) of the 50 percent by weight aqueous stabilized barium titanate dispersion was added to 0.5 lb (about 227 g) of the polyethylene (PE) wax employed in Example 1. The barium titanate/DDAB/PE wax dispersion contained less than 0.1 percent by weight residual water (as determined by Karl Fischer titration). The composition of the wax dispersion was 80 percent by weight surfactant-stabilized barium titanate and 20 percent by weight PE wax. The wax dispersion was cooled to dry ice temperature and ground to a coarse powder. The amount of coarse powder obtained was 2.3 lbs (about 1 kg).

Polypropylene Compounding

The 2.3 lbs (about 1 kg) of surfactant-stabilized barium titanate/PE wax powder was dry blended with 97.7 lbs (about 44 kg) of the same type of polypropylene employed in Example 1. The mixture was melt blended using a single screw compounding extruder operating at 330° F. (about 166° C.) and between 80 and 100 rpm screw speed. The resultant blend was pelletized, dry blended, extruded, and pelletized a second time in an effort to ensure compositional homogeneity through-out the entire 100 lbs (about 45 kg) of material. The blend had a nominal barium titanate concentration of 2 percent by weight. This material then was used as a stock concentrate to produce three additional dilutions having nominal barium titanate concentrations ranging from 1 percent by weight to 0.1 percent by weight barium titanate as summarized in Table 6. Each dilution was dry blended, extruded, and pelletized twice to ensure compositional homogeneity.

TABLE 6

Polypropylene/Barium Titanate Formulations

| Code | Weight[a] of 2% Blend | Weight[a] Polymer | BaTiO$_3$ Concn.[b] |
|---|---|---|---|
| PF-C | 50 (22.7) | 50 (22.7) | 1.0 (0.16) |
| PF-D | 25 (11.3) | 75 (34) | 0.5 (0.08) |
| PF-E | 5 (2.3) | 95 (43.1) | 0.1 (0.02) |

[a]Lbs (kg).
[b]Percent by weight (percent by volume).

Nonwoven Fabric Formation

Meltblown nonwoven fabrics were prepared on a research meltblowing line essentially as described in U.S. Pat. No. 3,849,241 to Buntin et al., identified earlier. Meltblown fabrics were made from the PROFAX® PF-015 polypropylene alone (PP-A) as a control and the polypropylene/stabilized barium titanate formulations containing 1.0 percent by weight and 0.1 percent by weight barium titanate (PF-C and PF-E, respectively). The formulation containing 0.5 percent by weight barium titanate (PF-D) was not melt spun. In each case, webs having basis weights ranging from 0.5 osy (about 17 gsm) to 2.0 osy (about 67 gsm) were prepared. The melt-spinning conditions used for the control and barium titanate formulations were identical.

Two rolls of material were made at each basis weight for the control and the two barium titanate formulations. Each pair of rolls were identified as "A" and "B" rolls, in which the "A" and "B" designated the electret treatment conditions used during manufacturing.

All "A" rolls were electret treated on-line with the spinning process. The electret treatment was carried out as described in Example 1. On-line electret treatment necessitated changing the rate at which the nonwoven web passed through the treatment zones to accommodate the line speed needed to produce fabric having various basis weights. In general, line speeds varied from 30 ft/min (about 15 cm/sec) to 120 ft/min (about 61 cm/sec), corresponding to nonwoven materials ranging in basis weight from 2.0 osy (about 68 gsm) to 0.5 osy (about 17 gsm). The electret treater utilized two treatment zones or stations. The upstream station had an air gap of 1 inch (about 2.5 cm) between the anode (charge bar) and the cathode (bias roll). The upstream bias roll and charge bar potentials were −5 kV and 0 kV, respectively. The down-stream station also had an air gap of 1 inch (about 2.5 cm) between the anode (charge bar) and the cathode (bias roll). The down-stream bias roll and charge bar potentials were −5 kV and 10 to 13 kV, respectively. The electret treater was purged with air at 20 standard cubic feet per minute (SCFM).

The "B" rolls were electret treated off-line from the spinning process, also as described in Example 1. Off-line electret treatment was performed at a line speed of 30 ft/min (about 15 cm/sec) for all basis weights and all materials. The air gap in both upstream and down-stream treatment stations was 1 inch (about 2.5 cm). The bias roll potential was −5 kV and the charge bar potential was 10 to 13 kV for both treatment stations. The electret treater was purged with air at 23 SCFM.

Results

Air Filtration Measurements

The air filtration efficiencies of the meltblown nonwovens prepared above were evaluated as described in Example 1. Tables 7 through 9 summarize the pressure drops and percent particle penetrations for materials electret treated on-line. Tables 10 through 12 summarize the pressure drops and percent particle penetrations for materials electret treated off-line.

TABLE 7

Air Filtration Results for PF-A Webs
Electret Treated On-Line ("A" Rolls)

| BW[a] | Pressure Drop[b] | σ(Δp)[c] | % P | σ(% p)[d] |
|---|---|---|---|---|
| 2.0 (68) | 4.59 | 0.10 | 3.97 | 0.32 |
| 1.5 (51) | 3.02 | 0.08 | 3.14 | 0.26 |
| 1.0 (34) | 2.24 | 0.05 | 6.57 | 0.75 |
| 0.75 (25) | 1.50 | 0.0 | 11.04 | 1.01 |
| 0.5 (17) | 1.10 | 0.07 | 17.76 | 1.81 |

[a]Basis weight, osy (gsm).
[b]In mm water.
[c]Standard deviation of pressure drop measurements.
[d]Standard deviation of percent penetration measurements.

TABLE 8

Air Filtration Results for PF-C Webs
Electret Treated On-Line ("A" Rolls)

| BW[a] | Pressure Drop[b] | σ(Δp)[c] | % P | σ(% p)[d] |
|---|---|---|---|---|
| 2.0 (68) | 4.01 | 0.07 | 3.47 | 0.36 |
| 1.5 (51) | 2.96 | 0.13 | 1.92 | 0.18 |
| 1 0 (34) | 2.13 | 0.08 | 5.46 | 0.72 |
| 0.75 (25) | 1.45 | 0.10 | 8.39 | 0.79 |
| 0.5 (17) | 1.00 | 0.05 | 16.33 | 3.19 |

[a]Basis weight, osy (gsm).
[b]In mm water.
[c]Standard deviation of pressure drop measurements.
[d]Standard deviation of percent penetration measurements.

TABLE 9

Air Filtration Results for PF-E Webs
Electret Treated On-Line ("A" Rolls)

| BW[a] | Pressure Drop[b] | σ(Δp)[c] | % P | σ(% p)[d] |
|---|---|---|---|---|
| 2.0 (68) | 4.09 | 0.09 | 2.61 | 0.21 |
| 1.5 (51) | 3.12 | 0.08 | 2.04 | 0.10 |
| 1.0 (34) | 2.06 | 0.07 | 6.46 | 0.91 |
| 0.75 (25) | 1.46 | 0.08 | 10.27 | 0.82 |
| 0.5 (17) | 0.92 | 0.06 | 18.01 | 1.75 |

[a]Basis weight, osy (gsm).
[b]In mm water.
[c]Standard deviation of pressure drop measurements.
[d]Standard deviation of percent penetration measurements.

TABLE 10

Air Filtration Results for PF-A Webs
Electret Treated Off-Line ("B" Rolls)

| BW[a] | Pressure Drop[b] | σ(Δp)[c] | % P | σ(% p)[d] |
|---|---|---|---|---|
| 2.0 (68) | 4.88 | 0.14 | 0.47 | 0.08 |
| 1.5 (51) | 3.41 | 0.10 | 0.91 | 0.10 |
| 1.0 (34) | 2.37 | 0.08 | 3.54 | 0.50 |
| 0.75 (25) | 1.83 | 0.06 | 8.63 | 0.83 |
| 0.5 (17) | 1.45 | 0.08 | 14.40 | 1.07 |

[a]Basis weight, osy (gsm).
[b]In mm water.
[c]Standard deviation of pressure drop measurements.
[d]Standard deviation of percent penetration measurements.

TABLE 11

Air Filtration Results for PF-C Webs
Electret Treated Off-Line ("B" Rolls)

| BW[a] | Pressure Drop[b] | σ(Δp)[c] | % P | σ(% p)[d] |
|---|---|---|---|---|
| 2.0 (68) | 4.52 | 0.13 | 0.72 | 0.10 |
| 1.5 (51) | 3.29 | 0.10 | 0.95 | 0.10 |
| 1.0 (34) | 2.57 | 0.08 | 2.59 | 0.39 |
| 0.75 (25) | 2.07 | 0.05 | 5.25 | 0.56 |
| 0.5 (17) | 1.31 | 0.05 | 12.31 | 0.97 |

[a]Basis weight, osy (gsm).
[b]In mm water.
[c]Standard deviation of pressure drop measurements.
[d]Standard deviation of percent penetration measurements.

TABLE 12

Air Filtration Results for PF-E Webs
Electret Treated Off-Line ("B" Rolls)

| BW[a] | Pressure Drop[b] | σ(Δp)[c] | % P | σ(% p)[d] |
|---|---|---|---|---|
| 2.0 (68) | 4.50 | 0.08 | 0.63 | 0.09 |
| 1.5 (51) | 3.41 | 0.08 | 0.71 | 0.13 |
| 1.0 (34) | 2.36 | 0.08 | 3.26 | 0.96 |
| 0.75 (25) | 1.63 | 0.05 | 7.58 | 0.71 |
| 0.5 (17) | 1.22 | 0.04 | 14.58 | 0.93 |

[a]Basis weight, osy (gsm).
[b]In mm water.
[c]Standard deviation of pressure drop measurements.
[d]Standard deviation of percent penetration measurements.

Pressure Drop

No significant change in pressure drop was observed at any given basis weight for meltblown material prepared from polypropylene alone as compared to the stabilized barium titanate/polypropylene formulations independent of electret treatment conditions. Notably, a small increase in pressure drop was measured for the materials electret treated off-line compared to those treated on-line. This was attributed to compaction of the nonwoven web during unwinding and rewinding of the fabric rolls during treatment.

Nonwoven Filter Media and Particle Penetration

Figure 3:
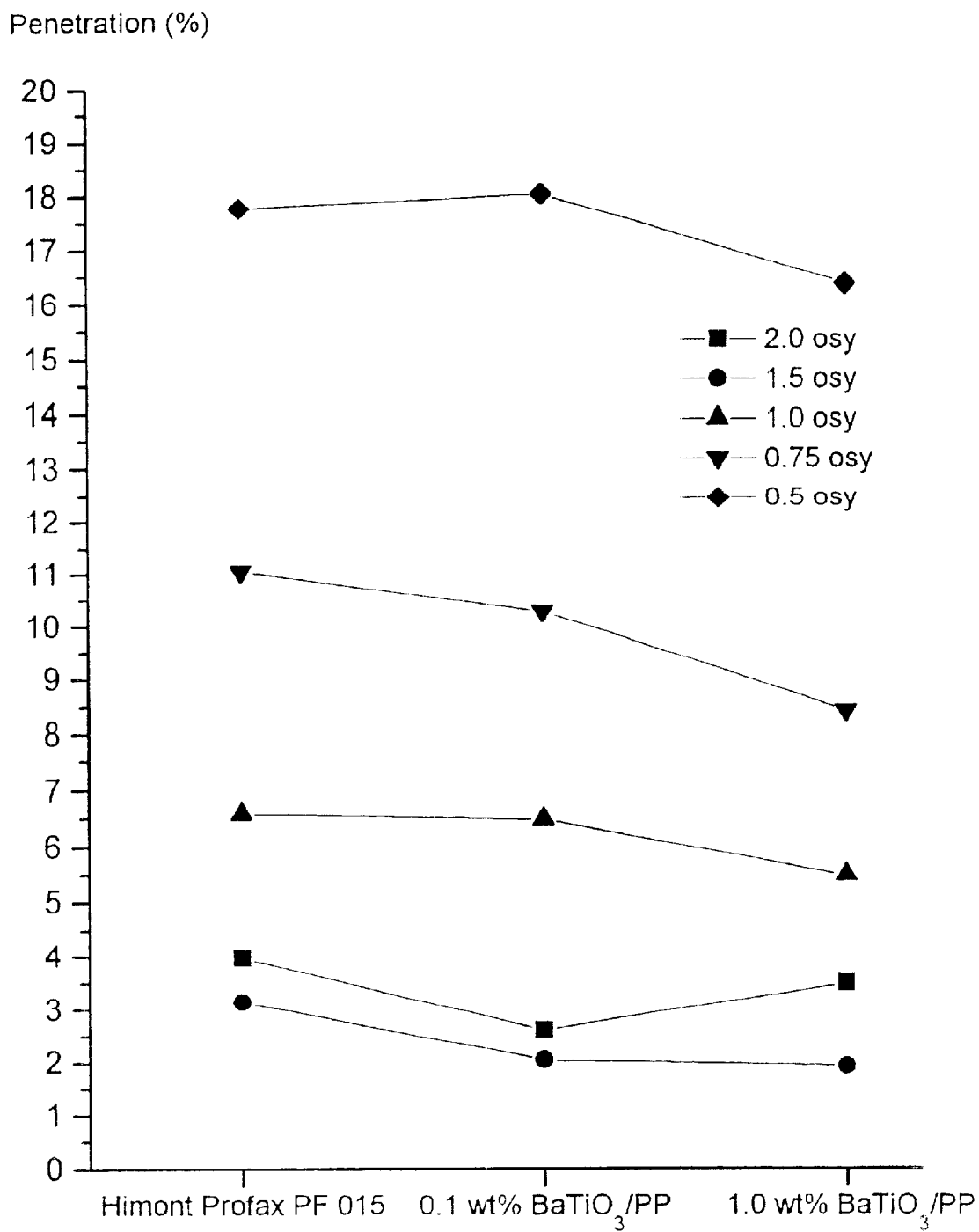
FIGS. 3 and 4 are plots of percent penetration versus the formulations from which the various nonwoven webs of Example 2 were prepared.
Figure 4:
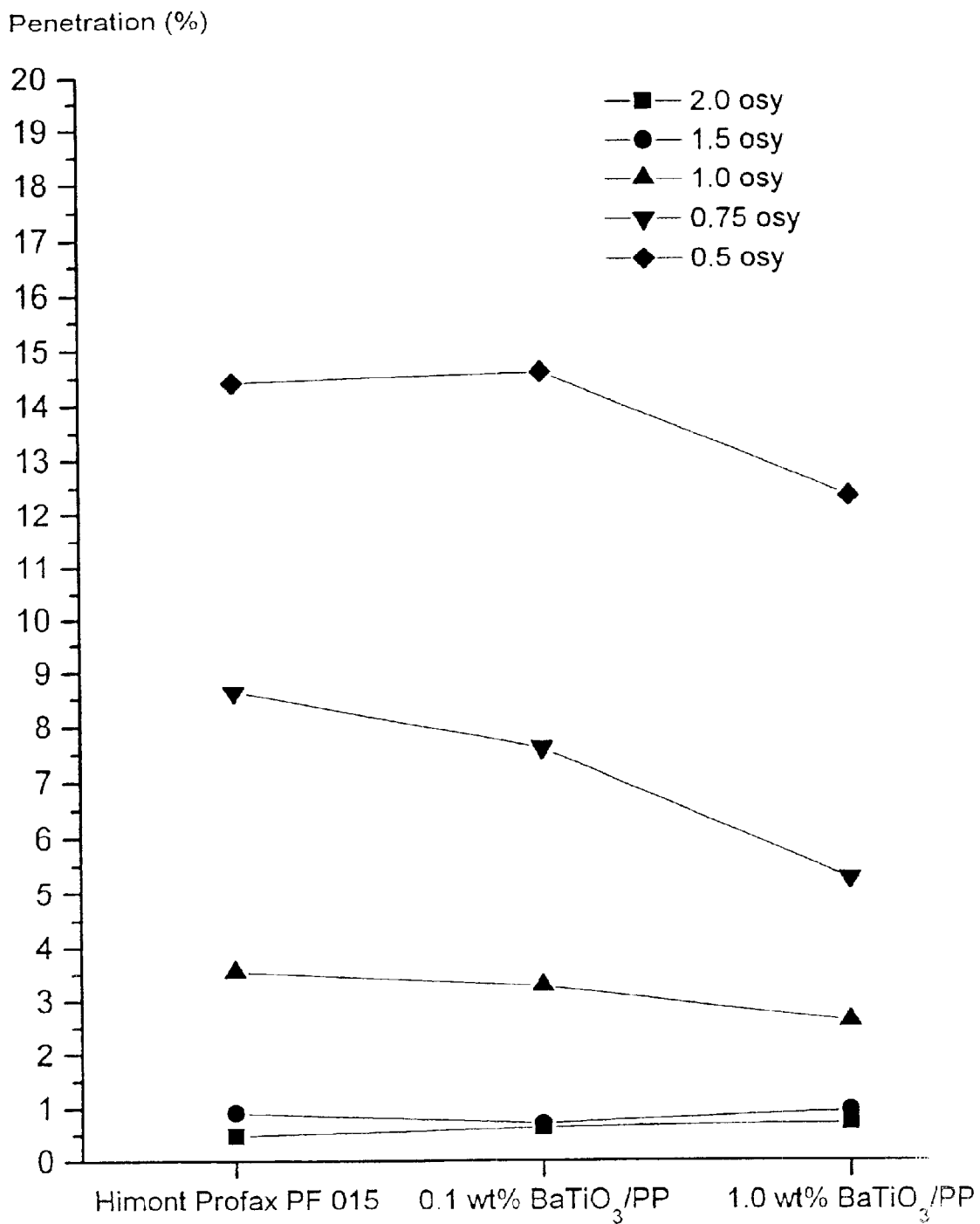

The filtration efficiency of the nonwoven media is given as the percent penetration. The percent particle penetrations were lower for off-line electret treatment compared to on-line. This difference was attributed to the differences in electret conditions cited above. Filter media treated on-line and off-line both exhibited the same trend toward improved filtration efficiency with the addition of barium titanate particles to the fibers; (see FIGS. 3 and 4, described below).

The largest improvement was observed for material containing 1.0 percent by weight barium titanate. The efficiency systematically increased with the concentration of barium titanate for all but the two highest basis weights (1.5 osy and 2.0 osy). At basis weights above 1.5 osy the effect of adding the barium titanate was difficult to observe. The improved filtration performance of the barium titanate formulations compared to polypropylene alone are best illustrated by the graphs shown in FIGS. 3 and 4. In these graphs, the data points represent the percent penetration for a given type of nonwoven web. The consistent behavior illustrated by FIGS. 3 and 4 suggests that the barium titanate particles were responsible for the improved filtration efficiencies of the nonwoven materials described in this example.

EXAMPLE 3

Material Preparation

The ferroelectric colloidally enhanced nonwoven fabrics described in this example were prepared as described in Example 1, except for the differences in preparation and treatment which are described below.

Colloid Preparation

The barium titanate was obtained from Tam Ceramics, Inc. (TIOON 5016® barium tritanate). The colloidal dispersion was prepared using a large scale stainless steel mixing tank (about 130 gal or 492 L) equipped with a pneumatically driven stirrer. The dispersion was processed through a high speed stainless steel pin/attriter mill powered by a 50 hp electric motor operating at 1750 rpm. The mixing tank and pin/attriter mill were custom built by Standridge Color Corporation (Social Circle, Ga.). The bottom half of the mixing tank was funnel shaped. The mixing tank was connected to a pneumatic pump and in turn the pump was connected to the pin/attriter mill using a 2.5-inch (about 10 cm) diameter flexible hose. The effluent from the mill was recycled into the top of the mixing tank. The pneumatic pump had a displacement of 0.25 gal (about 0.95 L) per stroke and was operated at a rate which provided a flow of 8–10 gal/min (about 0.5–0.6 L/sec).

The mixing tank was filled with 190 lb. (86.4 kg) of technical grade 1-butanol. Then, 7.2 lb (3.27 kg) of RHO-DAMEEN PN430 (Rhone-Poulenc) was added with vigorous stirring. The barium titanate was added in 55-lb (about 25 kg) portions until a total of 770 lb (about 350 kg) had been added to the mixing tank. The slurry was pumped to the high speed pin/attriter mill and recycled to the mixing tank for approximately 30 min. The resultant 1-butanol dispersion was uniform in composition and contained 80 weight-percent barium titanate.

Polyethylene Wax Dispersion Formation

The 80 weight-percent barium titanate/1-butanol dispersion was added directly to a molten low molecular weight polyethylene (PE) wax (Allied Signal A-C 16). Note that in the previous examples a 50 weight-percent aqueous dispersion of barium titanate was added to the molten PE wax in a process commonly known in the art as flushing. In the present example, the stabilized colloidal particles of barium titanate were partitioned from a 1-butanol rich phase into a PE wax rich phase and the 1-butanol was removed by vaporization. This process differs from water/wax flushing in that the 1-butanol boils above the melting point of the A-C 16 PE wax. The wax was melted in a 150-gal (about 568-L) steam-heated vat equipped with rotating blades which slowly blend the mixture. Steam was supplied to the vat at 50 psig, corresponding to a temperature of about 297° F. (about 147° C.).

In this example, 969.20 lb. (440.55 kg) of 1-butanol/barium titanate/RHODAMEEN® PN-430 dispersion was combined with 190.8 lb. (86.73 kg) of A-C 16 PE wax. The molten wax and 1-butanol dispersion were blended continuously until no alcohol vapor was detected over the mixture. At this point, the BaTiO$_3$/RHODAMEEN® PN-430/A-C 16 PE wax dispersion was poured into a tray to cool to room temperature. The solidified wax composite was further cooled to dry ice temperature and ground to a coarse powder for dry blending with polypropylene.

Polypropylene Compounding

The BaTiO$_3$/RHODAMEEN® PN-430/A-C 16 PE wax composite, 832 lb (about 378 kg) was dry blended with 2,496 lb (about 1339 kg) of Montel PROFAX® PF-015 polypropylene (PP). The dry mixture was melt blended using a single screw compounding extruder to give a mixture containing 20 weight-percent of barium titanate.

A 600-lb. (273-kg) portion of the 20 weight-percent concentrate prepared above was then blended with 1800 lb (about 818 kg) of Montel PROFAX® PF-015 polypropylene. This dry blend was melt blended using a single screw compounding extruder to yield a 5 weight-percent barium titanate/polypropylene composite.

Nonwoven Fabric Formation

Nonwoven fabrics were manufactured on a 100-inch (about 2.5-meter) meltblown line essentially as described in U.S. Pat. No. 3,849,241 to Buntin et al. The 100-inch wide web was slit into five 20-inch (about 51-cm) sections. Meltblowing conditions were held constant for all materials. All fabrics had a nominal basis weight of 0.6 osy (about 20 gsm). The 20 weight-percent barium titanate/polypropylene composite was dry blended at a rate of 1 part to 19 parts of virgin Montel Profax® PF-015 polypropylene to yield a meltblown fabric containing about 1 weight-percent barium titanate. In addition, the 5 weight-percent barium titanate/polypropylene composite was processed without further dilution. Finally, virgin Montel Profax® PF-015 polypropylene was meltspun to produce a control. All meltblown nonwoven webs were electret treated on-line under identical conditions. The electret treatment was carried out in accordance with the teachings of U.S. Pat. No. 5,401,446 to Tsai et al., described earlier.

Results

Air Filtration Measurements

The air filtration efficiencies of the meltblown nonwoven webs were evaluated using a TSI, Inc. Model 8110 Automated Filter Tester as described in the previous examples. Data is presented in tabular and figure form as percent penetration and pressure drop measured for a 32 L/min air stream containing 0.1 micron NaCl particles as the challenge aerosol.

Samples of meltblown material were taken from ten cross deckle positions (i.e. 2 per 20 inch slit) of the nonwoven webs described above. Samples were cut as flat sheets approximately 8-inches (about 20-cm) square. A minimum of 20 samples were evaluated for pressure drop ($\Delta$p in mm H$_2$O)) and percent particle penetration (% P). Tables 13 through 15 summarize the pressure drop and particle penetration data for the control (Montel PROFAX® PF-015) and the barium titanate containing formulations.

TABLE 13

Air Filtration Results for Control Webs

| CD[a] | Pressure Drop[b] | σ(Δp)[c] | % P[d] | σ(% p)[e] |
|---|---|---|---|---|
| 5 (13) | 2.07 | 0.07 | 17.35 | 0.64 |
| 15 (38) | 1.90 | 0.07 | 20.83 | 1.31 |
| 25 (64) | 2.42 | 0.08 | 13.42 | 1.12 |
| 35 (89) | 2.64 | 0.08 | 11.77 | 1.08 |
| 45 (114) | 2.72 | 0.08 | 11.27 | 0.85 |
| 55 (140) | 2.75 | 0.09 | 12.59 | 1.23 |
| 65 (165) | 2.64 | 0.09 | 13.15 | 1.09 |
| 75 (190) | 2.47 | 0.10 | 13.77 | 1.03 |
| 85 (216) | 2.24 | 0.05 | 17.29 | 1.19 |
| 95 (241) | 2.32 | 0.06 | 14.09 | 1.06 |

[a]Cross-deckle position, inches (cm).
[b]In mm water.
[c]Standard deviation of pressure drop measurements.
[d]Percent penetration
[e]Standard deviation of percent penetration measurements.

TABLE 14

Air Filtration Results for 1 Weight-Percent BaTiO$_3$

| CD[a] | Pressure Drop[b] | σ(Δp)[c] | % P[d] | σ(% p)[e] |
|---|---|---|---|---|
| 5 (13) | 2.26 | 0.08 | 7.85 | 0.58 |
| 15 (38) | 1.92 | 0.06 | 10.98 | 0.87 |
| 25 (64) | 2.25 | 0.07 | 8.46 | 1.06 |
| 35 (89) | 2.57 | 0.09 | 5.99 | 0.41 |
| 45 (114) | 2.73 | 0.09 | 5.68 | 0.63 |
| 55 (140) | 2.79 | 0.11 | 4.86 | 0.42 |
| 65 (165) | 2.49 | 0.08 | 6.88 | 0.62 |
| 75 (190) | 2.47 | 0.09 | 7.08 | 0.58 |
| 85 (216) | 2.21 | 0.07 | 9.88 | 1.12 |
| 95 (241) | 2.18 | 0.06 | 9.59 | 1.01 |

[a]Cross-deckle position, inches (cm).
[b]In mm water
[c]Standard deviation of pressure drop measurements.
[d]Percent penetration
[e]Standard deviation of percent penetration measurements.

TABLE 15

Air Filtration Results for 5 Weight-Percent BaTiO$_3$

| CD[a] | Pressure Drop[b] | σ(Δp)[c] | % P[d] | σ(% p)[e] |
|---|---|---|---|---|
| 5 (13) | 1.81 | 0.06 | 7.05 | 0.41 |
| 15 (38) | 1.67 | 0.05 | 8.85 | 0.63 |
| 25 (64) | 2.3 | 0.07 | 5.83 | 0.44 |
| 35 (89) | 2.53 | 0.07 | 4.97 | 0.63 |
| 45 (114) | 2.72 | 0.13 | 4.08 | 0.33 |
| 55 (140) | 2.59 | 0.11 | 3.86 | 0.39 |
| 65 (165) | 2.34 | 0.08 | 4.72 | 0.52 |
| 75 (190) | 2.35 | 0.08 | 4.72 | 0.34 |
| 85 (216) | 2.12 | 0.1 | 6.16 | 0.55 |
| 95 (241) | 2.06 | 0.05 | 6.14 | 0.86 |

[a]Cross-deckle position, inches (cm).
[b]In mm water
[c]Standard deviation of pressure drop measurements.
[d]Percent penetration
[e]Standard deviation of percent penetration measurements.

Figure 5:
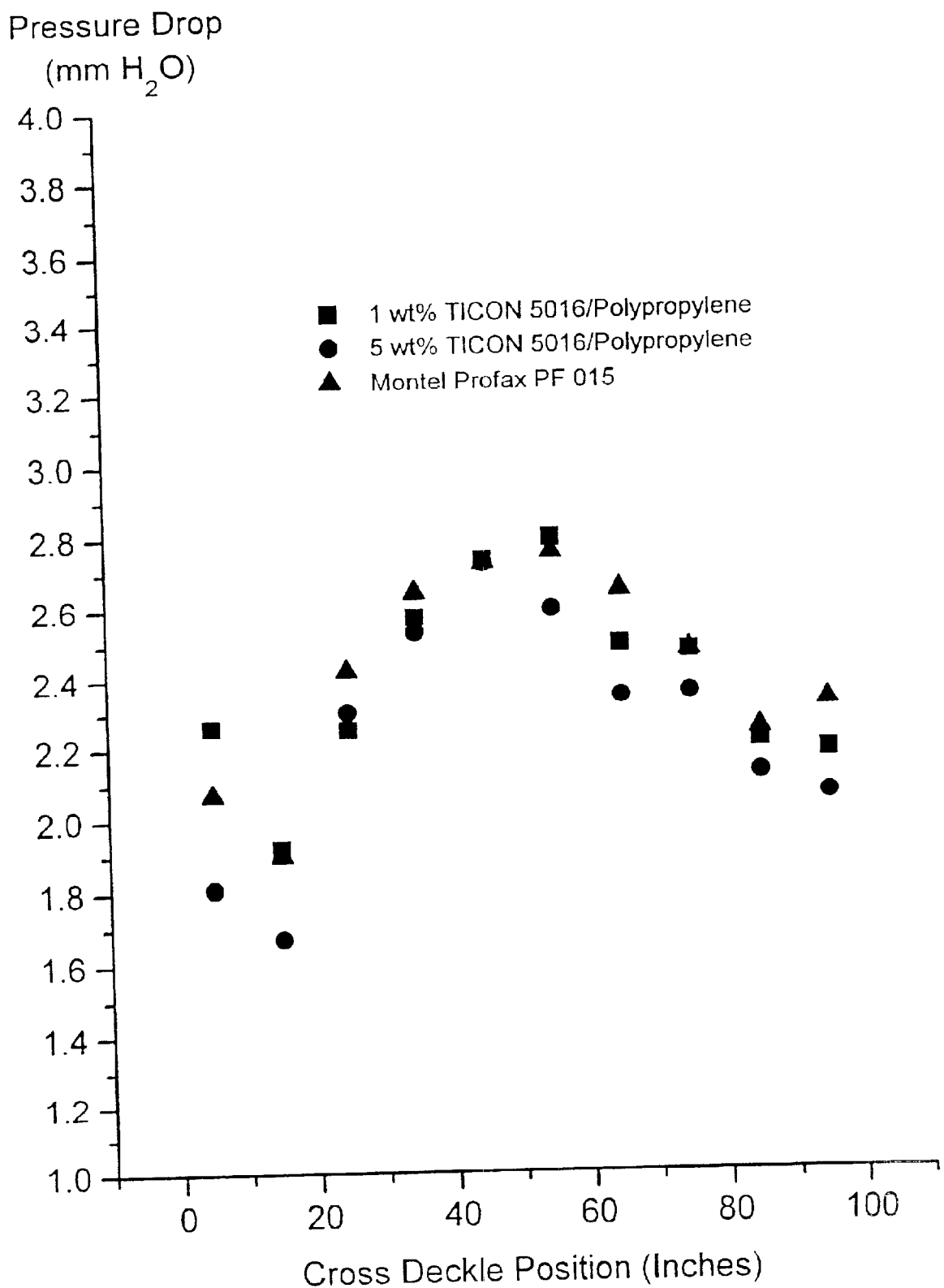
FIGS. 5 and 6 are plots of pressure drop and percent penetration, respectively, versus web cross deckle position for the various nonwoven webs of Example 3.
Figure 6:
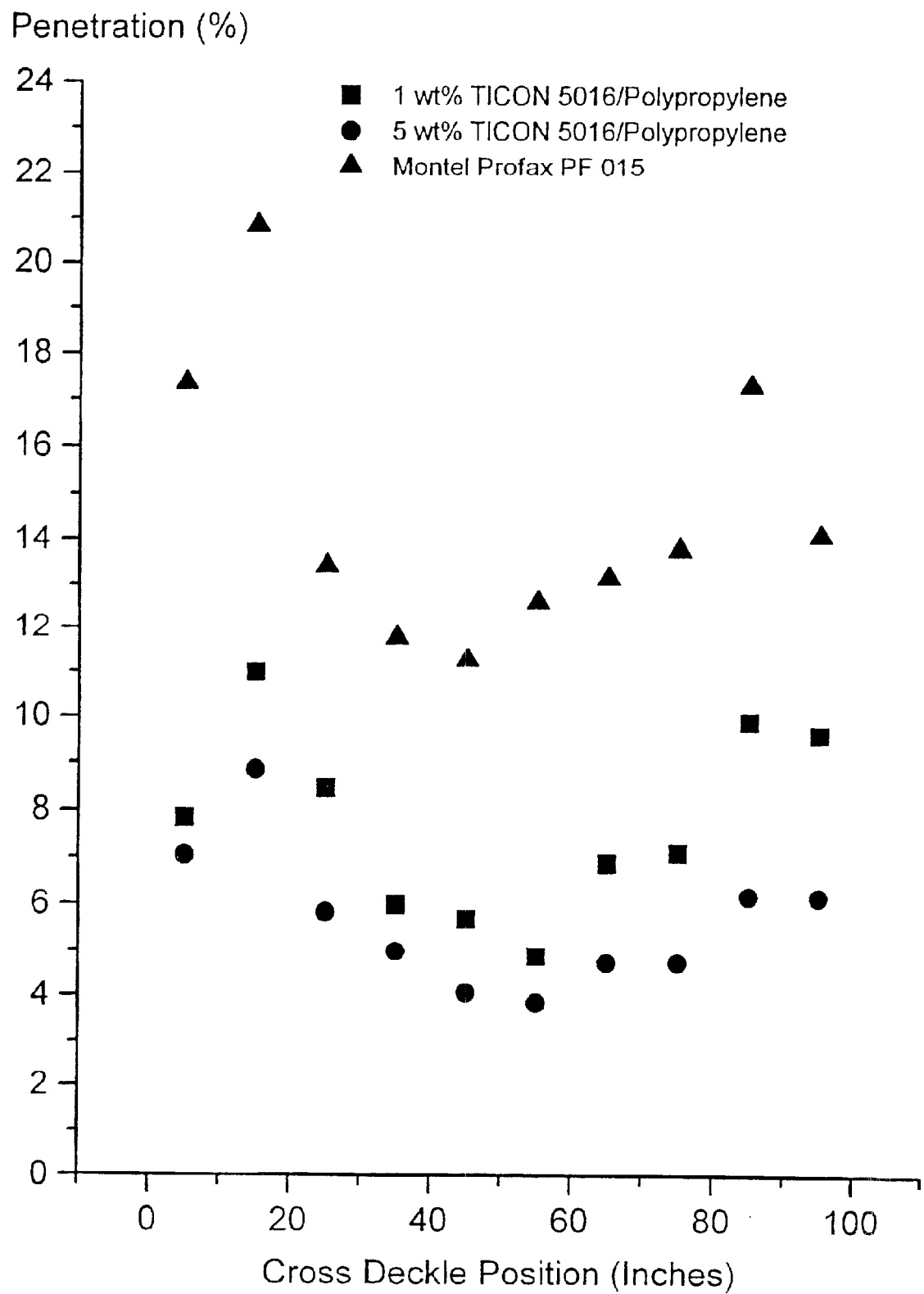

The pressure drop ($\Delta$p) and percent particle penetration (% P) data presented in Tables 13 through 15 clearly demonstrate the superior filtration performance of the meltblown webs prepared from the barium titanate/PP composite materials. All the webs examined were characterized by a cross-deckle profile in the pressure drop and penetration data. The shape of the profile was independent of the material. The filtration data are best visualized in FIGS. 5 and 6. The pressure drop measured across the web (FIG. 5) was identical for each of the three materials depicted. This suggests that fiber and web formation are independent of the material being spun (i.e, polypropylene versus barium titanate/PP composite). By contrast, the percent particle penetration (FIG. 6) was significantly lower for both the 1 weight-percent and 5 weight-percent $BaTiO_3$ formulations compared to the control polypropylene. Thus, for a given pressure drop through the web, the barium titanate/PP composite evinces superior filter performance (i.e., lower particle penetration) compared to the control polypropylene.

EXAMPLE 4

A promising potential air filtration application of electret-treated meltblown is its use in medical and surgical face masks. In order to verify its utility in such a product, the material must satisfy certain stringent air filtration tests (bacterial filtration efficiency greater than 98.5%, when challenged by a 3.0-micron aqueous aerosol containing bacteria, e.g., *Staphylococcus aureus*, and an air filtration efficiency greater than 99.5 percent when challenged by 0.1-micron latex particles). The material also must be subject to only moderate pressure drops through the web (typically, less than 2.5 mm $H_2O$ at a flow rate of 8 L/min).

The meltblown nonwoven webs of Example 3 were tested for bacterial filtration efficiency with differential pressure (in accordance with U.S. Department of Defense Index of Specifications and Standards #MIL-M-36954C). For comparison with Example 3, all webs were sampled from the same CD position (50 inches). Five replicate samples of each code were tested. The mean and standard deviation of these measurements are reported in Table 16. Pressure drops, $\Delta p$, are reported in mm $H_2O$; efficiencies, $\epsilon$, ar reported in percent. Where two values are reported, the first represents measurements made on material spun at the beginning of the production run and the second represents measurements made on material spun at the end of the production run. The ferroelectric colloidally enhanced meltblown nonwoven webs of the present invention exceeded the targets for both filtration efficiency and pressure drop.

TABLE 16

Bacterial Filtration Efficiency Results

| Percent $BaTiO_3$ | $\Delta p$ | $\sigma(\Delta p)$ | $\epsilon$ | $\sigma(\epsilon)$ |
|---|---|---|---|---|
| None | 2.12 | 0.08 | 99.66 | 0.09 |
|  | 1.86 | 0.05 | 99.32 | 0.27 |
| 1 | 2.12 | 0.04 | 99.84 | 0.09 |
|  | 1.94 | 0.05 | 99.70 | 0.26 |
| 5 | 1.82 | 0.11 | 99.78 | 0.08 |

The meltblown nonwoven webs of Example 3 also were tested for filtration efficiency when challenged by 0.1 micron latex particles (in accordance with ASTM Test Method F1215-89). Again, all webs were sampled from the same CD position (50 inches). Five replicate samples of each code were tested. The mean and standard deviation of these measurements are reported in Table 17. Again, efficiencies, $\epsilon$, are reported in percent. Where two values are reported, the first represents measurements made on material spun at the beginning of the production run and the second represents measurements made on material spun at the end of the production run. The ferroelectric colloidally enhanced meltblown nonwoven webs of the present invention met or exceeded the filtration efficiency targets.

TABLE 17

Latex Particle Filtration Efficiency Results

| Percent $BaTiO_3$ | $\epsilon$ | $\sigma(\epsilon)$ |
|---|---|---|
| None | 99.28 | 0.08 |
|  | 99.02 | 0.04 |
| 1 | 99.46 | 0.05 |
|  | 99.62 | 0.04 |
| 5 | 99.70 | 0.07 |

While the specification has been described in detail with respect to specific embodiments thereof, it will be appreciated that those skilled in the art, upon attaining an understanding of the forgoing, may readily conceive of alterations to, variations of, and equivalents to these embodiments.

What is claimed is:

1. A face mask comprising a nonwoven web of thermoplastic polymer fibers wherein said thermoplastic polymer fibers comprise a ferroelectric material dispersed therein exposed of an electric field in order to reorient the polarization of the ferroelectric to form an electric material.

2. The face mask of claim 1 wherein said ferroelectric material comprises from about 0.01% to about 50% by weight of said fibers.

3. The face mask of claim 2 wherein said thermoplastic polymer comprises a polyolefin.

4. The face mask material of claim 1 wherein said ferroelectric material comprises from about 0.1% to about 30% by weight of said fibers.

5. The face mask of claim 4 wherein said thermoplastic polymer comprises a propylene polymer.

6. The face mask of claim 5 wherein said ferroelectric material comprises a perovskite.

7. The face mask of claim 5 wherein said ferroelectric material is selected from the group consisting of barium titanate, lead titanate and solid solutions thereof.

8. The face mask of claim 4 wherein said ferroelectric material comprises a perovskite.

9. The face mask of claim 4 wherein said fibers comprise a polyolefin and have a diameter between 0.1 and about 10 micrometers.

10. The face mask of claim 9 wherein said ferroelectric material has a longest dimension less than about 10 micrometers.

11. The force mask of claim 4 wherein said nonwoven web comprising a meltblown fiber web.

12. The face mask of claim 4 wherein said nonwoven web comprises a spunbond fiber web.

13. The face mask of claim 1 wherein said ferroelectric material is selected from the group consisting of tungsten bronzes, bismuth oxides and pyrochlores.

14. The face mask of claim 1 wherein said thermoplastic polymer fibers comprise multicomponent fibers having two or more components, each of which is comprised of a thermoplastic polymer, and wherein ferroelectric material is dispersed within at least one of said components forming said multicomponent fibers at a level of from about 0.01 to about 50 percent by weight of the fiber.

15. The face mask of claim 14, in which the particles of the ferroelectric material have a longest dimension in a range of from about 10 nanometers to about 10 micrometers.

16. The face mask of claim 14, in which the ferroelectric material is selected from the group consisting of perovskites, tungsten bronzes, bismuth oxide layered materials, and pyrochlores.

17. The face mask of claim 16, in which the ferroelectric material is barium titanate.

18. The face mask of claim 14, in which the multicomponent fiber is a bicomponent spunbond fiber.

19. The face mask of claim 14, in which the multicomponent fiber is a bicomponent meltblown fiber.

20. A face mask comprising a nonwoven web of fibers comprising a polyolefin and from about 0.01 weight percent to about 50 weight percent of barium titanate particles based on the weight of the fibers, wherein said barium titanate particles comprise destructurized barium titanate particles and wherein said fibers are exposed to an electric field in order to reorient the spontaneous polarization of the barium titanate particles forming an electret material.

21. The face mask of claim 20 wherein said polyolefin is a polypropylene.

22. The face mask of claim 20 wherein said fibers comprise from about 0.5 weight percent to about 5 weight percent of barium titanate particles based on the weight of the fibers.

23. The face mask of claim 20 wherein said fibers further comprise a surfactant adapted to stabilize the barium titanate particles against agglomeration.

24. A method of preparing electret fibers containing particles of a ferroelectric material the method comprising:
   destructuring a ferroelectric material in the presence of a liquid and a surfactant to give destructed particles, wherein the liquid is a solvent for the surfactant and the surfactant is adapted to stabilize the destructured particles against agglomeration;
   forming a blend of the stabilized, destructured ferroelectric material particles and a thermoplastic polymer;
   melting the blend of the stabilized, destructured ferroelectric material particles and a thermoplastic polymer; and
   melt extruding the molten blend to form fibers;
   in which the particles of the ferroelectric material are present at a level of from about 0.01 to about 50 percent by weight, based on the weight of the fiber.

* * * * *